Figures 4, 5:
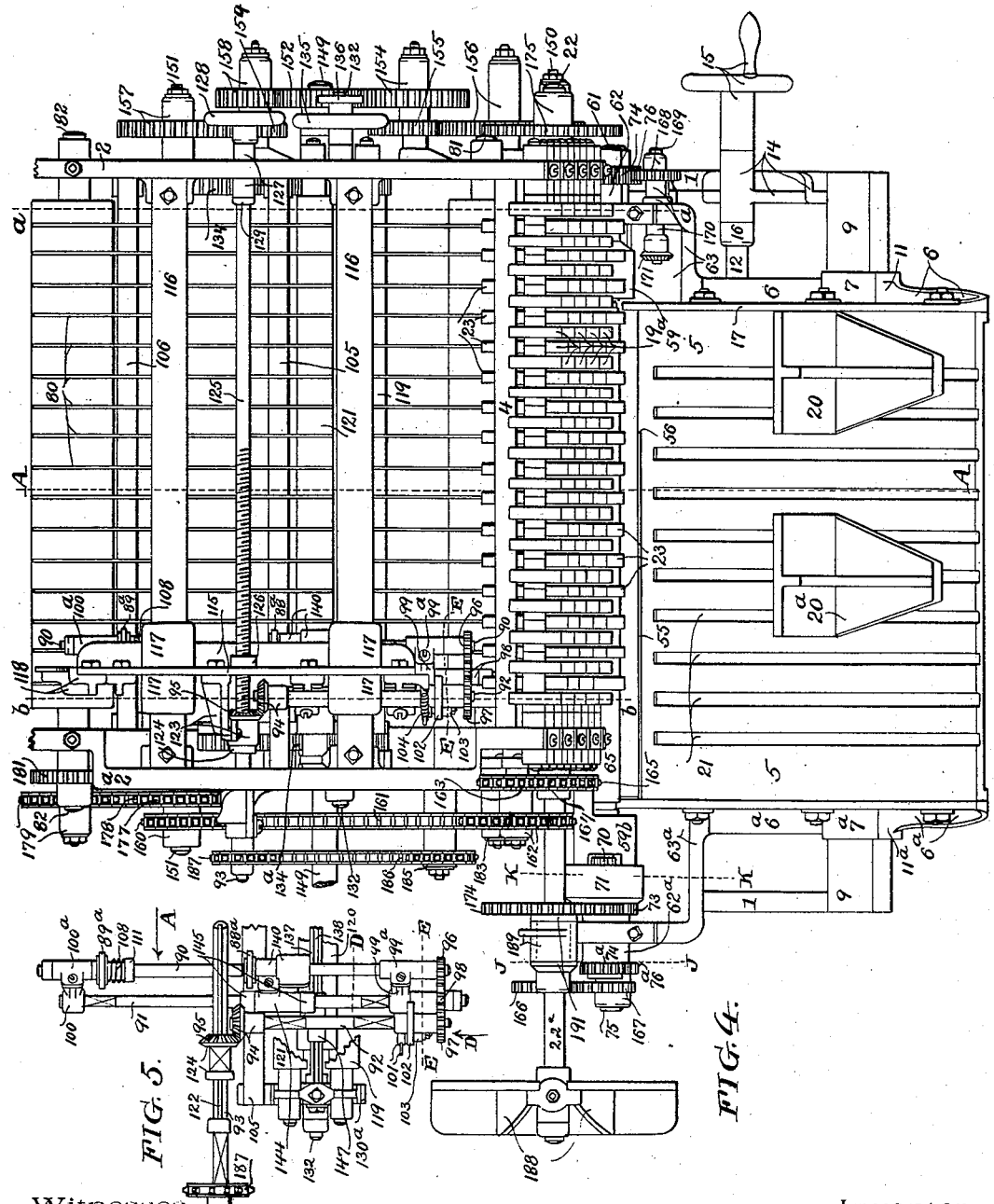

(No Model.) 9 Sheets—Sheet 1.
J. H. KNOWLES.
MACHINE FOR FEEDING SHEETS OF PAPER, &c.
No. 565,905. Patented Aug. 18, 1896.
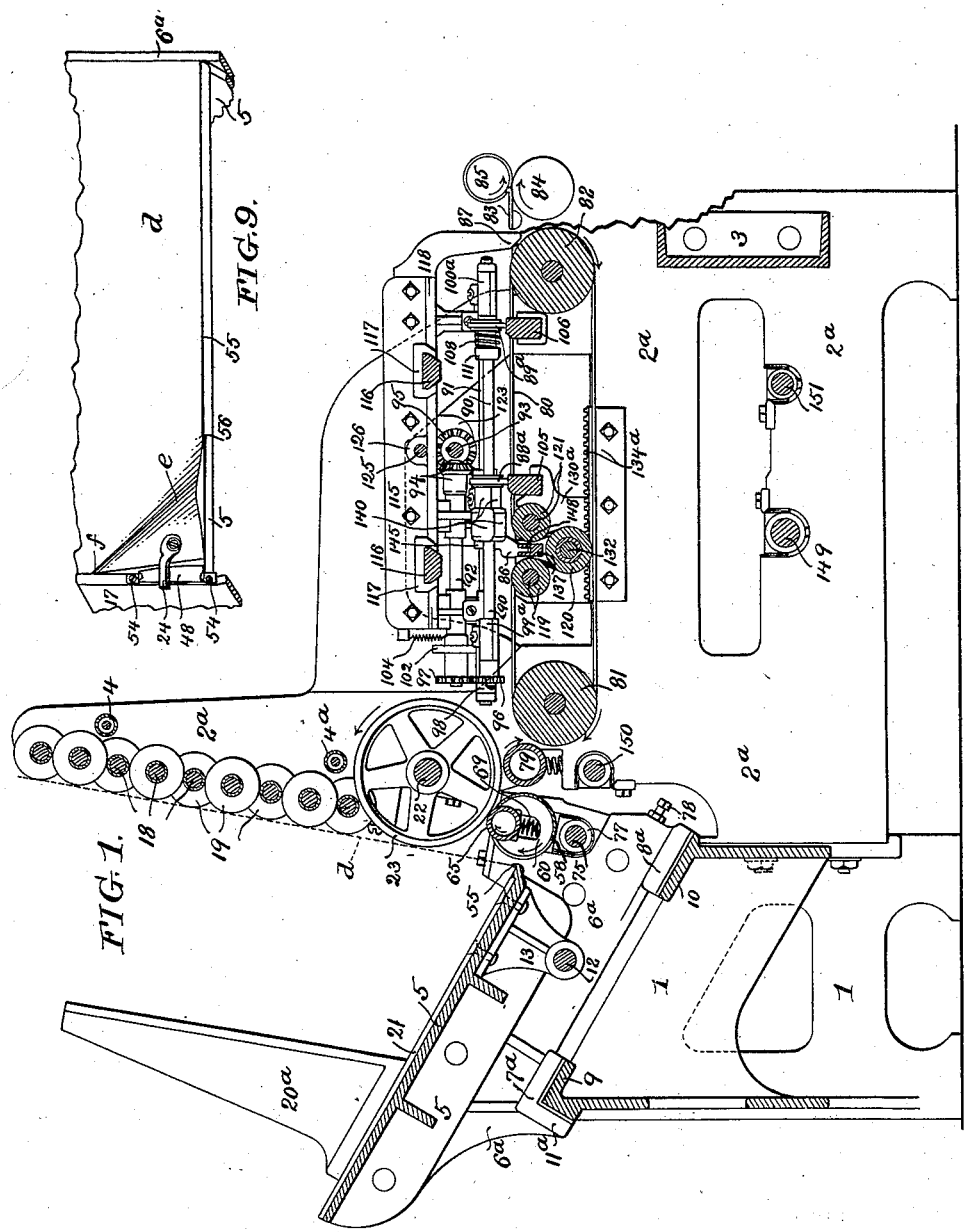
Witnesses.
Henry Drury
R. M. Kelly
Inventor.
John H. Knowles
By [signature]
Attorney.
THE NORRIS PETERS CO., PHOTO-LITHO., WASHINGTON, D. C.

(No Model.) 9 Sheets—Sheet 2.
J. H. KNOWLES.
MACHINE FOR FEEDING SHEETS OF PAPER, &c.
No. 565,905. Patented Aug. 18, 1896.
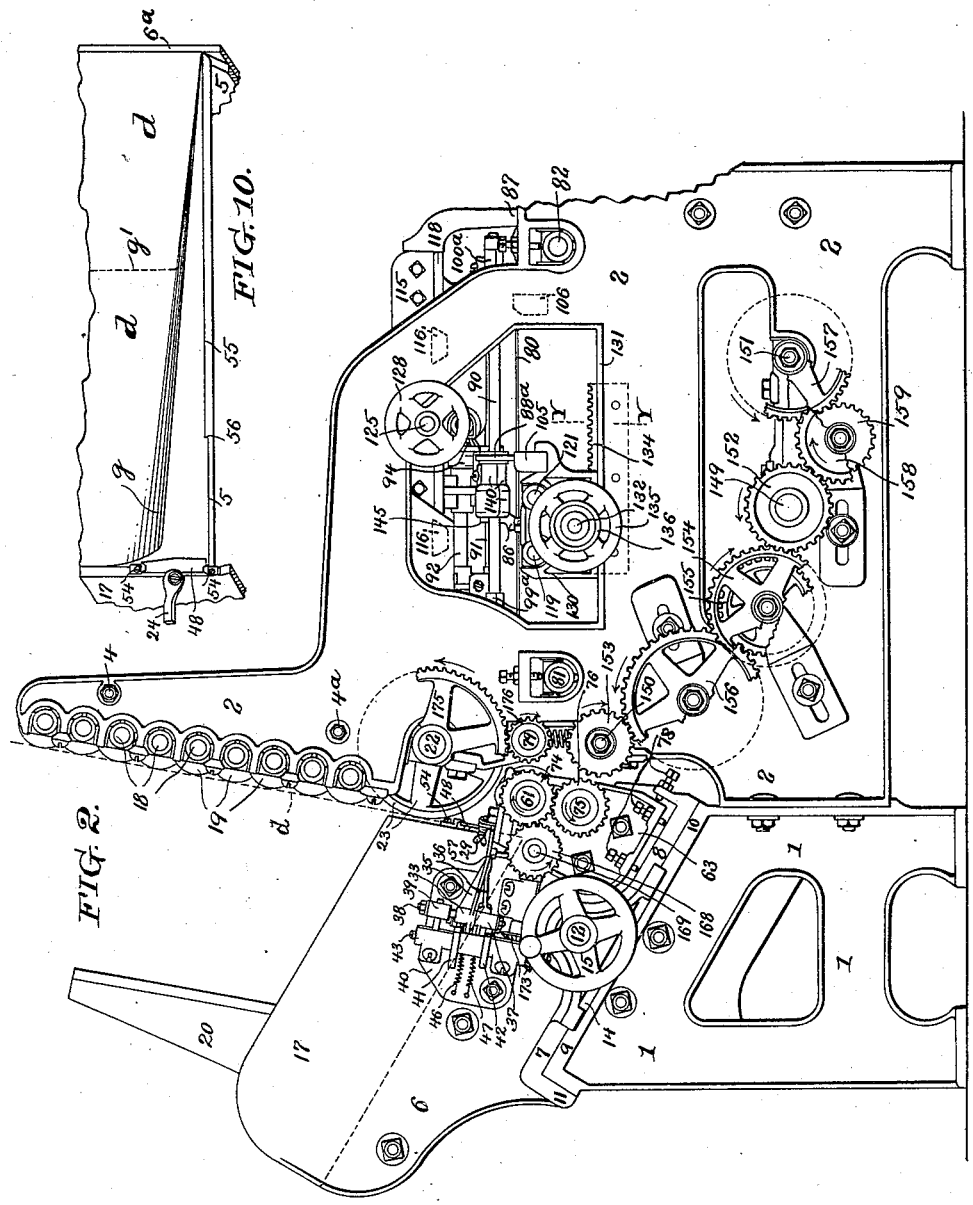
Witnesses. Inventor.

(No Model.) 9 Sheets—Sheet 3.
J. H. KNOWLES.
MACHINE FOR FEEDING SHEETS OF PAPER, &c.
No. 565,905. Patented Aug. 18, 1896.
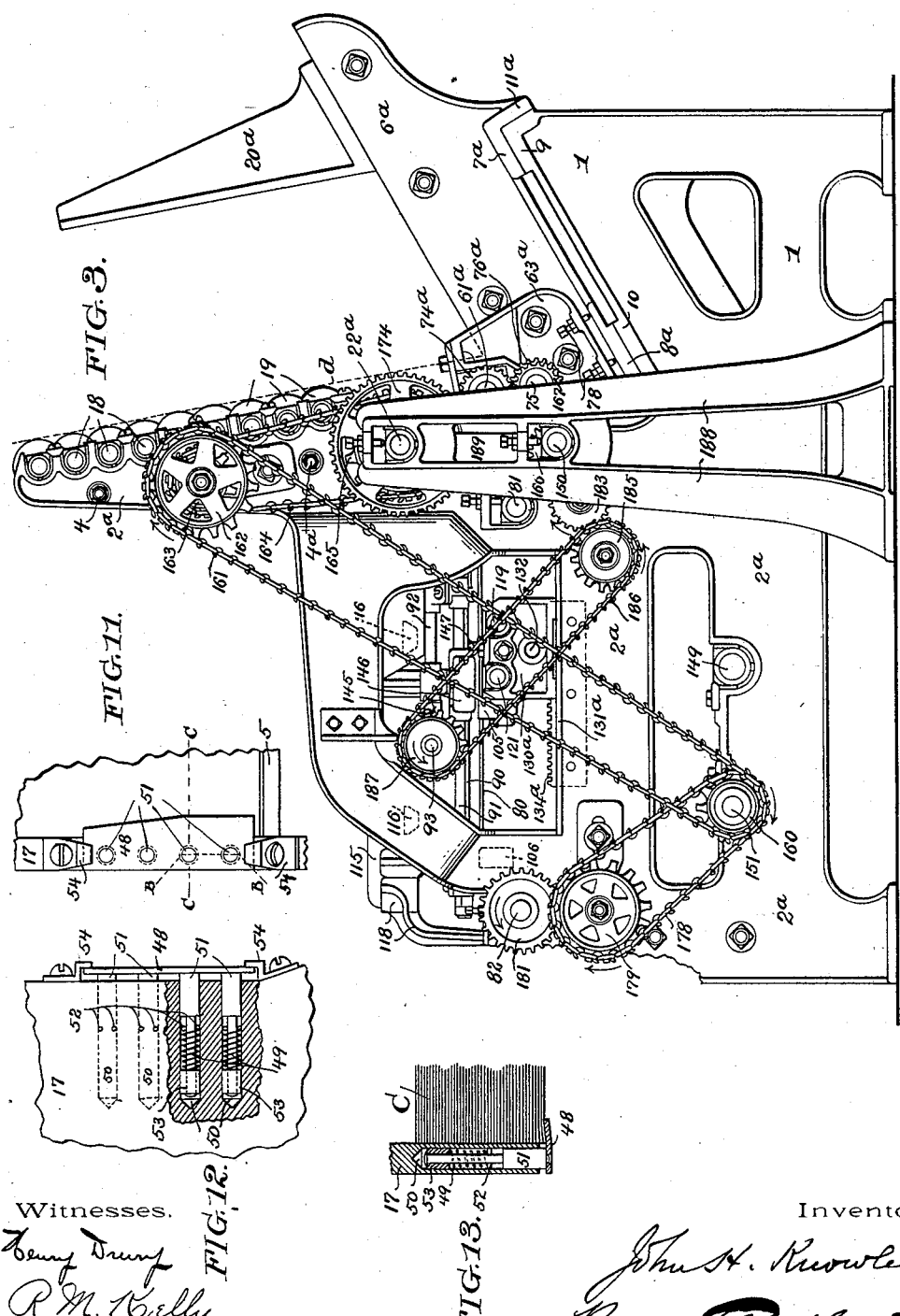
Witnesses. Inventor.
Attorney.

(No Model.) 9 Sheets—Sheet 4.
J. H. KNOWLES.
MACHINE FOR FEEDING SHEETS OF PAPER, &c.

No. 565,905. Patented Aug. 18, 1896.

Witnesses.  Inventor.

(No Model.) 9 Sheets—Sheet 5.
J. H. KNOWLES.
MACHINE FOR FEEDING SHEETS OF PAPER, &c.
No. 565,905. Patented Aug. 18, 1896.
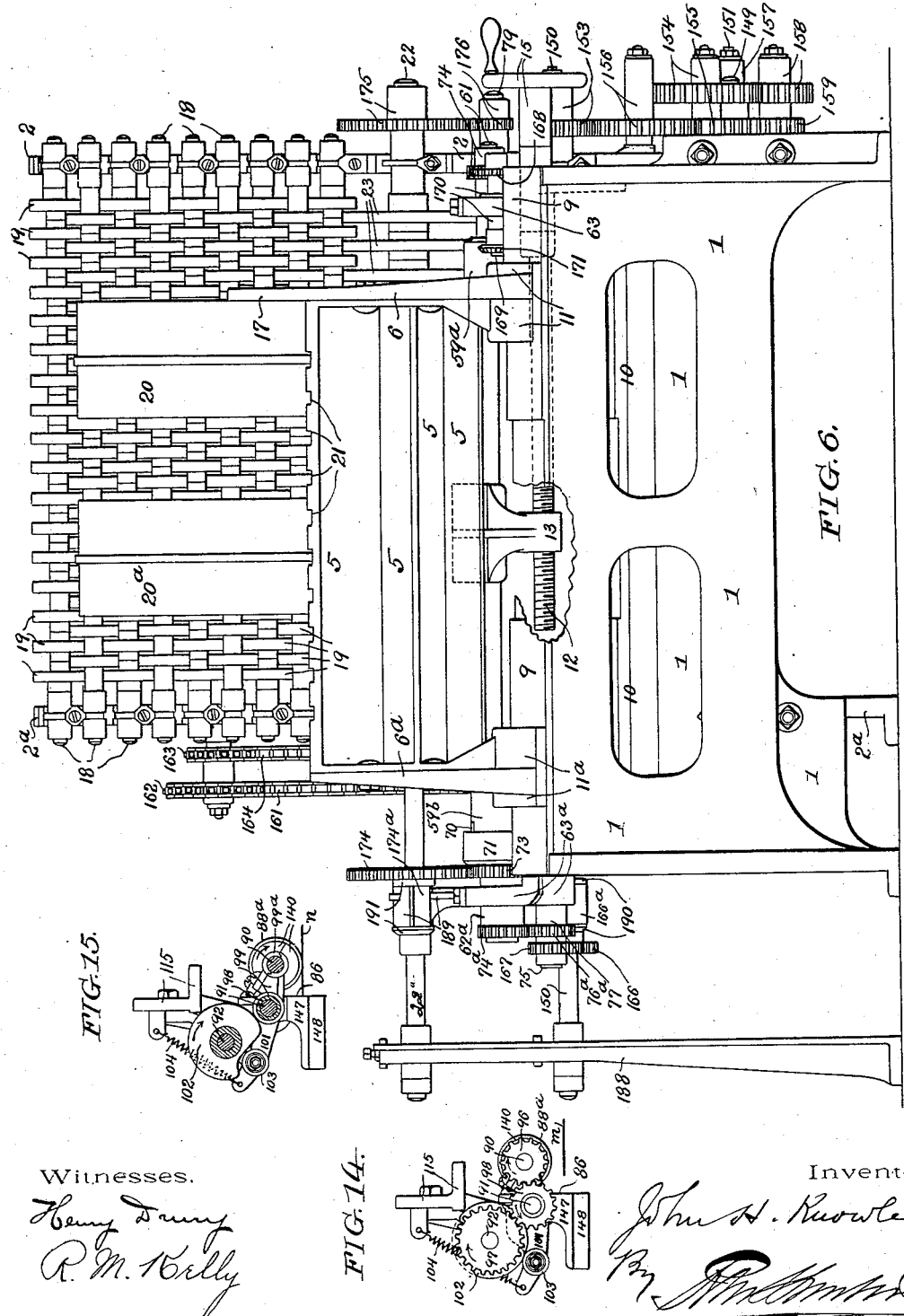
Witnesses.
Henry Drury
R. M. Kelly
Inventor.
John H. Knowles
By
Attorney.

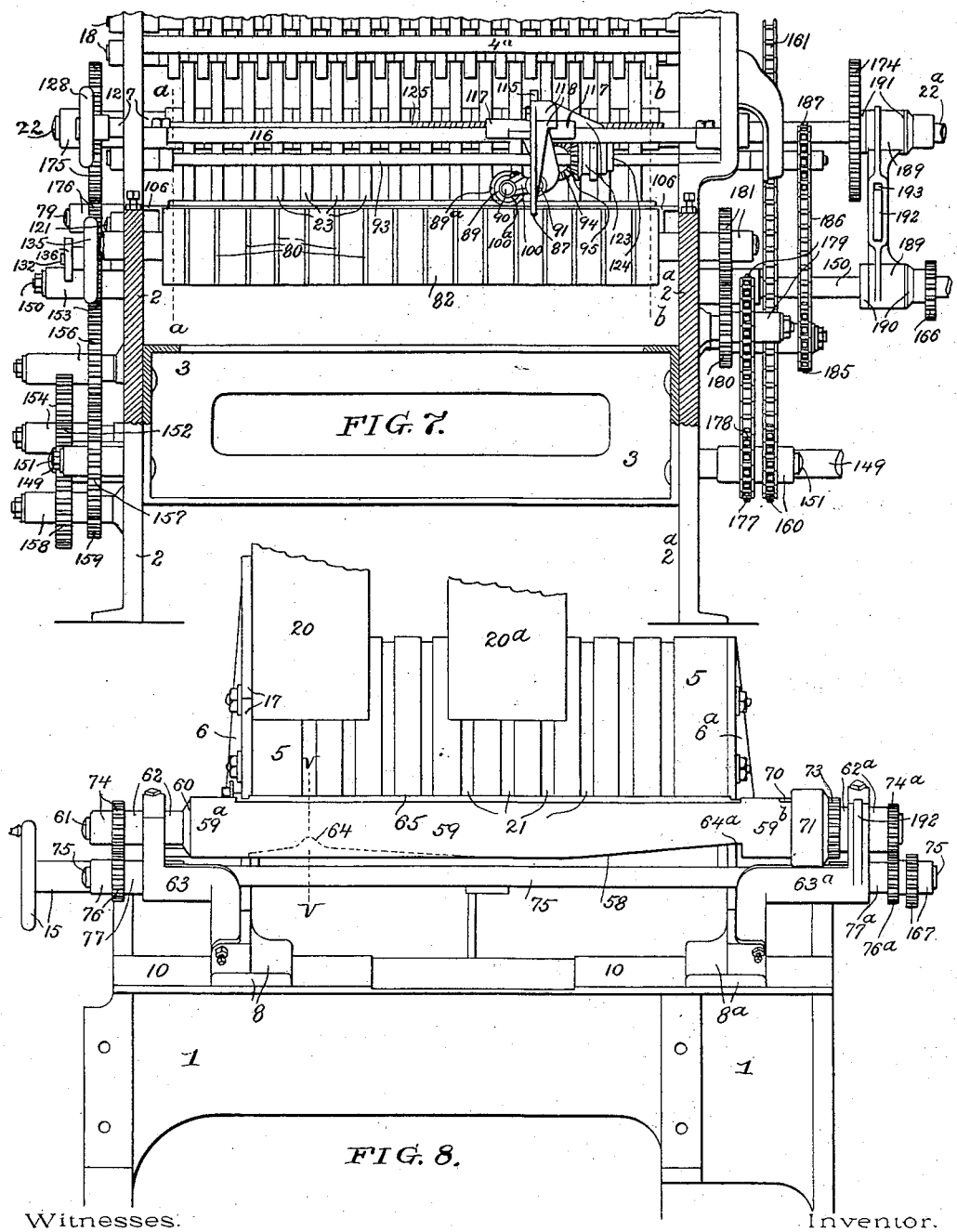

(No Model.) 9 Sheets—Sheet 7.
J. H. KNOWLES.
MACHINE FOR FEEDING SHEETS OF PAPER, &c.
No. 565,905. Patented Aug. 18, 1896.
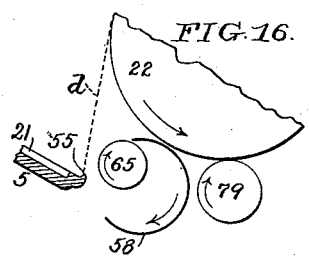
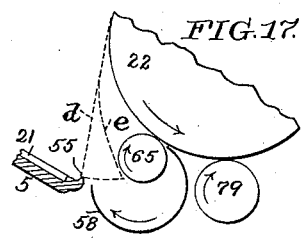
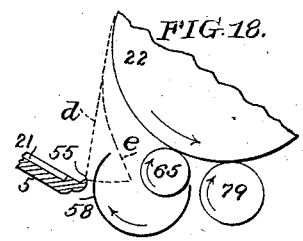
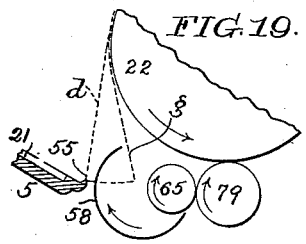
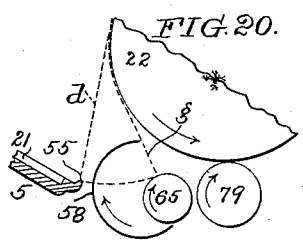
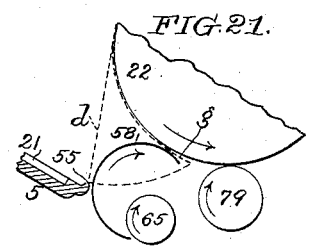
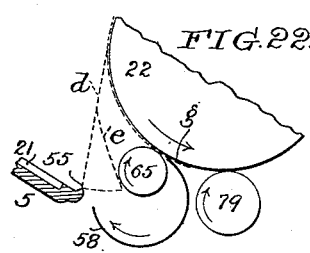
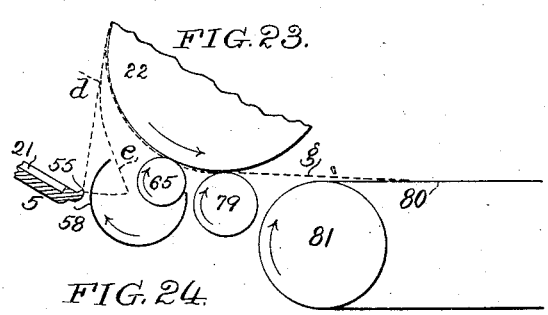
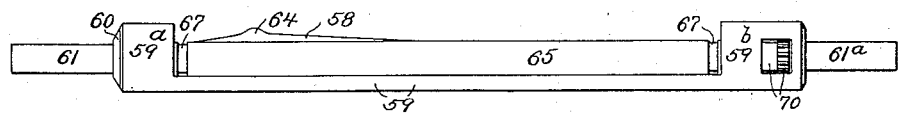
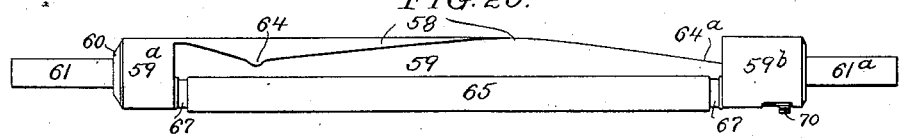
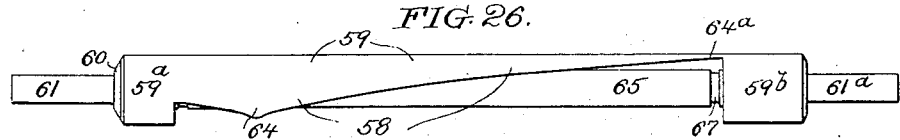
Witnesses.  Inventor.

(No Model.) 9 Sheets—Sheet 8.
J. H. KNOWLES.
MACHINE FOR FEEDING SHEETS OF PAPER, &c.
No. 565,905. Patented Aug. 18, 1896.
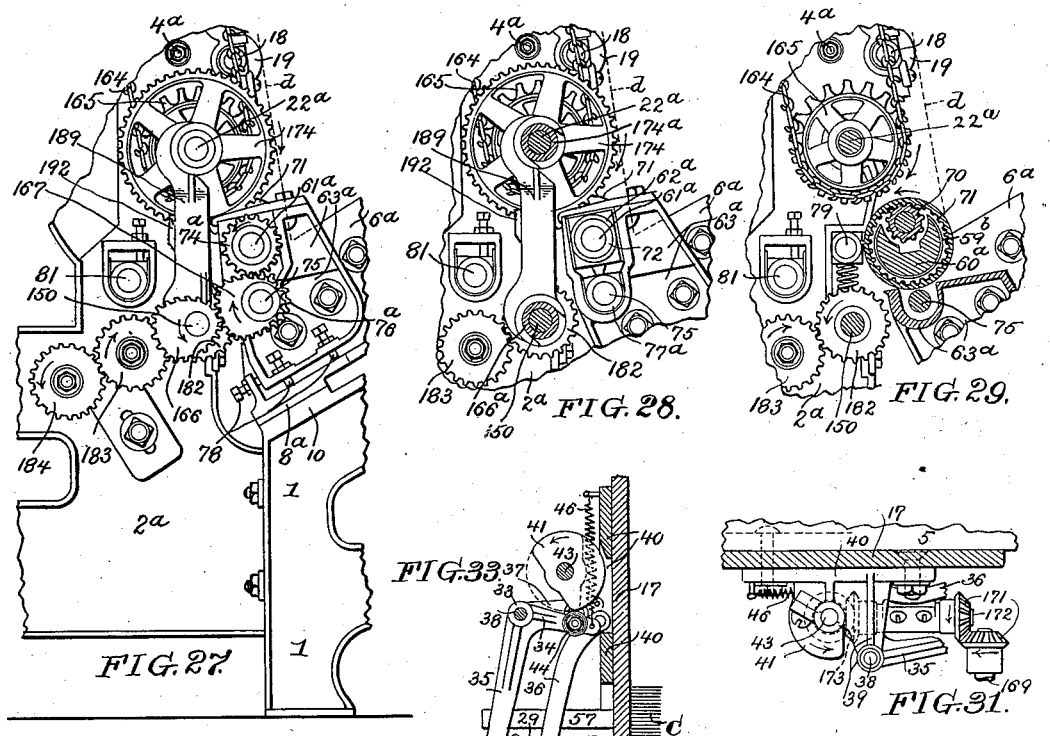
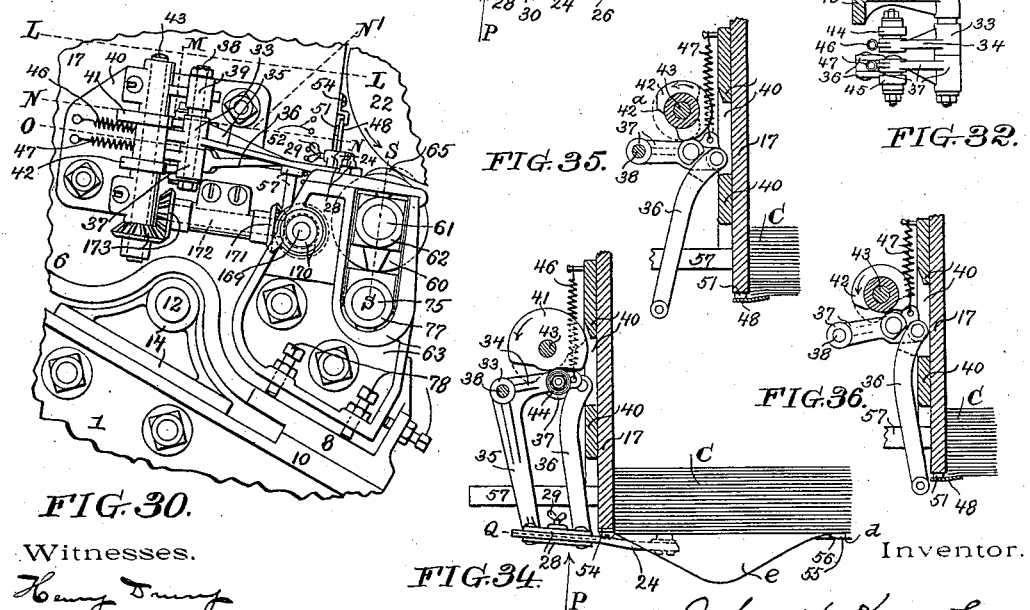
Witnesses. Inventor.

(No Model.) 9 Sheets—Sheet 9.
J. H. KNOWLES.
MACHINE FOR FEEDING SHEETS OF PAPER, &c.
No. 565,905. Patented Aug. 18, 1896.
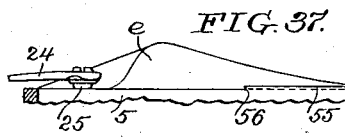
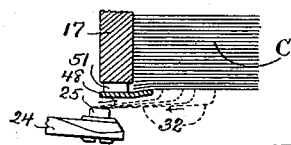
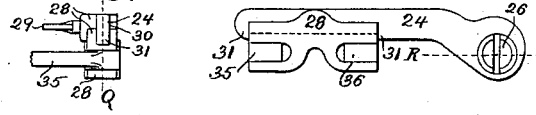
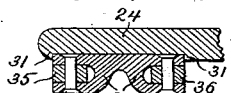
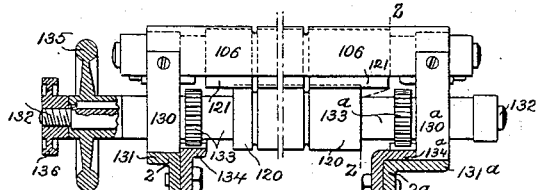
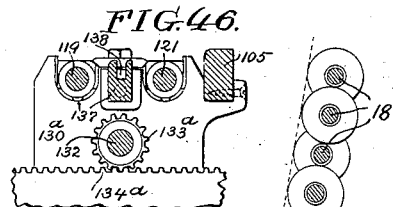
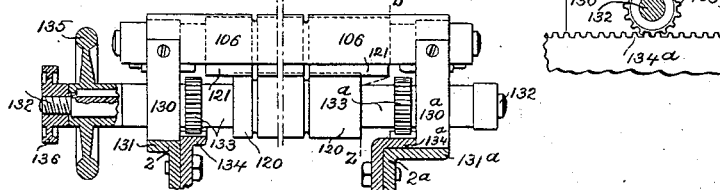
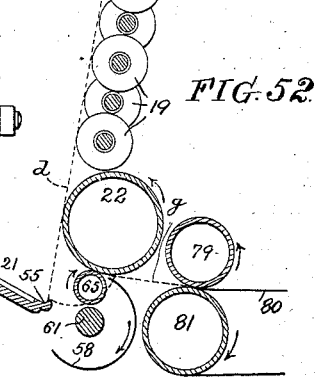
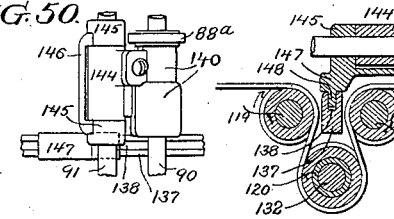
Witnesses. Inventor.
THE NORRIS PETERS CO., PHOTO-LITHO., WASHINGTON, D. C.

UNITED STATES PATENT OFFICE.

JOHN HENRY KNOWLES, OF PHILADELPHIA, PENNSYLVANIA.

MACHINE FOR FEEDING SHEETS OF PAPER, &c.

SPECIFICATION forming part of Letters Patent No. 565,905, dated August 18, 1896.

Application filed December 18, 1895. Serial No. 572,523. (No model.)

*To all whom it may concern:*

Be it known that I, JOHN HENRY KNOWLES, of the city and county of Philadelphia, State of Pennsylvania, have invented an Improvement in Machines for Feeding Sheets of Paper, &c., of which the following is a specification.

My invention relates to mechanism for separately removing sheets of paper, &c., from a pack or pile and delivering them singly to any machine to which it is desired to supply successive sheets; and it consists of the improvements which are described in the following specification and are shown in the accompanying drawings.

I have shown my invention embodied in an organized machine designed for separating the sheets from the pack or pile and delivering them in an accurately-registered condition to the machine to be fed; but the mechanism may, if desired, be embodied in and become a part of the machine which acts upon the separately-fed sheets.

My machine embraces improvements in the sheet-holding devices and in the devices for individualizing sheets from the pack or pile and for withdrawing the sheets when individualized.

My invention also includes a device for registering the sheets while they are upon the conveyer after they have been removed from the pack or pile.

In addition to these improvements, my invention also includes certain other features of construction and combination of parts, all of which are fully set forth and claimed hereinafter.

I shall now refer to the accompanying drawings for the purpose of more particularly describing my invention. It should, however, be understood that in the drawings only so much of a sheet-feeding machine is shown as is necessary to illustrate my improvements.

Figure 1 is a longitudinal vertical section of my improved machine for feeding sheets of paper, &c., taken on the line A A, Fig. 4. Fig. 2 is a side elevation of the machine. Fig. 3 is a view similar to Fig. 2 of the opposite side of the machine. Fig. 4 is a plan view of the machine with the buckling device omitted. Fig. 5 is a plan view of a portion of the machine with overlying parts removed to expose parts not clearly shown in Fig. 4. In this view the position of the bearings of certain shafts are indicated by crossed lines. Fig. 6 is a rear elevation of the machine with the buckling device omitted. Fig. 7 is a front elevation of a portion of the machine. Fig. 8 is a front elevation omitting the buckling device of that portion of the machine which remains after the frame sides 2 2ª and the parts carried thereby have been removed. Figs. 9 and 10 are front elevations, slightly in perspective, of the lower portion of the sheet-holder. Fig. 11 is a view similar to a portion of Fig. 9 or 10, and showing the corner-guard on an enlarged scale. Fig. 12 is a side elevation, partly in section, on the lines B B, Fig. 11. Fig. 13 is a horizontal section on the line C C, Fig. 11. Fig. 14 is an end elevation of a portion of the registering device, looking in the direction of the arrow D in Fig. 5. Fig. 15 is a transvese vertical section on the line E E, Figs. 4 or 5. Figs. 16 to 23 are enlarged vertical sections or diagrams similar to a portion of Fig. 1, showing the withdrawing devices in different positions. Figs. 24, 25, and 26 are elevations of the rotary edge-separating blade and the orbital initial-sheet-withdrawing roller in three positions. Fig. 27 is a fragmentary side elevation with the end stand 188 removed to show parts more clearly than the same are shown in Fig. 3. Figs. 28 and 29 are fragmentary side elevations, each partly in section, Fig. 28 on the line J J, and Fig. 29 on the line K K, in Fig. 4. Fig. 30 is a fragmentary side elevation, on an enlarged scale, with the hand-wheel 15 and gears 74, 76, and 168 removed to show parts more clearly than the same are shown in Fig. 2. Fig. 31 is a horizontal section on the line L L, Fig. 30, with parts broken away. Fig. 32 is a vertical section on the line M, Fig. 30, looking to the right. Figs. 33 to 36 are horizontal sections showing parts of the buckling device in different positions and taken, Fig. 33 on the line N N, Fig. 34 on the line N N', and Figs. 35 and 36 on the line O, all in Fig. 30. Fig. 37 is a view looking upward from below the front edge of the pack of sheets and showing the shape of the buckle formed in the foremost sheet by the buckling-finger. Fig. 38 is a view similar to a portion of Fig. 33 on an enlarged scale. Fig. 39 is an elevation of the buckling-finger on an enlarged scale, looking in the direction of the arrow P in Figs. 33 and 34. Fig. 40 is an end view of parts shown in Fig. 39. Fig. 41 is a vertical section on the line Q, Figs. 34 and 40. Fig. 42 is a horizontal section on the line R R, Fig. 39. Fig. 43 is a vertical transverse section on the line S S, Fig. 30, with the middle parts of the blade 58 and roller 65 omitted. Fig. 44 shows five transverse sections of the parts shown in Fig. 43, being taken, $a$ on the line T T, $b$ on the line U U, looking to the left, $d$ on the line W W, looking to the right, and $e$ on the line X X, looking to the left, all in Fig. 43, and $c$ on the line V V, looking to the right, in Fig. 8. Fig. 45 is an enlarged vertical transverse section on the line Y Y, Fig. 2, looking to the left. Fig. 46 is a vertical section on the line Z Z, Fig. 45, looking to the right. Fig. 47 is an enlarged elevation, partly in section, looking in the direction of the arrow A in Fig. 5, showing parts of the registering device. Fig. 48 shows two enlarged transverse sections of parts shown in Fig. 47, being taken, $a$ on the line B B, and $b$ on the line C C or C' C', looking to the right, in Fig. 47. In Fig. $48^b$ parts exterior to the hubs 110 or 112 are omitted. Fig. 49 is an enlarged transverse vertical section on the line D, Fig. 5, looking forward. Fig. 50 is a plan view of parts shown in Fig. 49. Fig. 51 is a vertical section on the line E E, Fig. 49, looking to the left; and Fig. 52 is a longitudinal vertical section of a portion of the machine, showing a modification.

In Figs. 4 and 7 the dotted lines $a\ a$ and $b\ b$ indicate the position occupied by the side edges of the widest sheets which the machine is adapted to handle.

For the purpose of enabling the detailed construction of the machine to be easily understood I shall refer to the different portions separately.

*The frame of the machine.*—1 is the bed-piece or base, which supports the adjustable bottom of the sheet-holder.

2 $2^a$ are the side frames of that portion of the machine which lies forward of the bed-piece 1, to which they may be bolted, as shown, and these frames may be connected together by suitable girths or braces 3, 4, and $4^a$. The frames 2 $2^a$ are shown broken away at their forward ends in Figs. 1, 2, 3, 4, and 7.

*The sheet holding and supporting devices.*— These devices are designed to hold a pack of sheets on edge, preferably in a position inclined slightly forward, and to permit the sheets to be successively withdrawn from the front of the pack.

In the drawings I have shown the preferable construction of the sheet-holding devices, but it will be readily understood that the devices may be modified and varied in construction without in any way affecting the other portions of my invention.

In the construction shown the bottom of the sheet-holder, with certain parts connected therewith, is transversely adjustable, while the front of the holder has a fixed position.

5 is the bottom of the sheet-holder, on which the edges of the sheets rest, and is preferably inclined upwardly and rearwardly. The bottom 5 is carried by end pieces 6 $6^a$, provided with guides 7 $7^a$ 8 $8^a$, adapted to rest and slide upon transverse ways 9 10 on the bed-piece 1. When arranged as shown, with the way 10 lower than the way 9, the guides 7 $7^a$ may be provided with extensions 11 $11^a$, adapted to engage the rear face of the way 9 and thereby hold the bottom 5 from moving forward.

The bottom 5 may be adjusted laterally on the ways 9 10 to bring the pack of sheets to any desired position with reference to the medial line of the feeding-machine and of the machine which receives sheets therefrom.

The bottom 5 may be adjusted on the ways 9 10 by a screw 12, journaled in a bearing 14 on the base 1 and engaging a threaded sleeve or boss 13 on the under side of the bottom. In Fig. 6 a portion of the bed-piece 1 is broken away to expose the screw 12 and sleeve 13. The screw 12 may be operated by a hand-wheel 15 or equivalent device, and may be maintained in position longitudinally by a collar 16 and by the hub of the hand-wheel making contact with opposite ends of the bearing 14. (See Fig. 4.)

17 is a side guide for the pack of sheets, which may be formed by an extension of one of the end pieces, as 6, which support the bottom 5. When my improved individualizing and edge-bending devices are arranged as shown, the pack of sheets must be placed in the holder with the sheets on one side of the pack against the guide 17 in order to aline the sheets for the proper action of the individualizing and edge-bending devices.

The front of the holder may consist of any suitable support arranged at the proper inclination to the bottom 5. I prefer, however, to construct the front of the holder of a series of idler-rollers 18, arranged in a peculiar manner. I am aware that idler-rollers have heretofore been employed in a series to support the face of a pack of sheets. The surfaces of rollers so employed have been continuous and the rollers have been arranged side by side. When thus arranged, pockets are formed between adjacent rollers, into which the foremost sheets in the pack are liable to sink, thereby increasing the friction against the foremost sheet while it is being withdrawn from the pack. To overcome this fault, I have heretofore employed stationary slats to support the sheets between adjacent rollers, as shown, *e. g.*, in my Letters Patent No. 544,764, dated August 20, 1895, but there is always some friction against the sheets as they are dragged over the fixed slats. In the construction here shown I have provided the rollers 18 each with a series of disks 19, and I have arranged the rollers so that the disks of one roller will intersect or extend between the disks of the adjacent rollers. By this means a front having a practically continuous rolling surface will be produced, which will present very little friction to the sheets being drawn over it.

In the drawings the rollers 18 are shown, each consisting of a shaft supported in bearings in extensions of the side frames 2 2ª, and carrying a series of disks 19, which may be loosely mounted on the shaft, so as to turn freely thereon, or they may be fixed on the shaft, which in this case is permitted to turn loosely in its bearings. The latter construction is preferable, as it forms a stiffer roller.

A pack of sheets leaning against a front constructed as described rests against numerous supporting-points, provided by the disks of the several rollers, staggeringly arranged over the whole area of support, as shown in Fig. 6.

20 20ª are pressers which press upon the back of the pack and hold the pack in place with the foremost sheet in contact with the front of the holder. These pressers may be of ordinary construction and may be guided in their movements by projections therefrom engaging grooves 21 in the bottom 5. When my improved individualizing device is employed, one of the pressers, for instance the presser 20, should be located close to the guide 17 on that side of the holder adjacent to which the individualizing device is arranged, but the presser 20ª may be adjusted laterally to such position as may be desired.

The front of the sheet-holder is shown supported independently from the adjustable bottom 5, but a front constructed as here described may be attached to the bottom and be adjustable with it, as would be the case if this front were substituted for the front shown in my aforesaid Letters Patent No. 544,764.

While for most uses it is desirable to construct my feeding-machine with the adjustable bottom 5, yet when sheets of but a single width are to be fed, or when a side edge of the pack of sheets may remain in one position laterally, my machine may have a fixed bottom.

*The sheet individualizing and withdrawing mechanism.*—This mechanism embraces a withdrawing-drum, a buckling-finger, and a rotary separator-blade, combined with an orbital initial-sheet-withdrawing roller, and an assistant withdrawing-roller.

22 is the withdrawing drum or cylinder, having a constant rotation in the direction of the arrow in Fig. 1 and located in front of the sheet-holder at a proper distance above the bottom piece 5, with its surface adjacent to the face of the pack of sheets. I have shown this drum constructed of a series of disks 23, mounted on a shaft supported by bearings carried by the side frame 2 2ª. The disks 23 may intersect or extend between the disks of the lowermost roller 18, so as to lessen the pocket between the lower roller 18 and the drum for reasons heretofore stated in the description of the front of the holder.

The drum 22 may, however, be constructed with a continuous surface and may be placed entirely below the lower roller 18, as shown in Fig. 52.

24 is the buckling-finger carrying the frictional pad 25, adapted to operate upon the surface of the foremost sheet in the pack. (See Figs. 30 to 42.)

The pad 25, which is preferably formed of rubber, is secured to a thimble 26, as by being screwed or threaded into a socket formed in the thimble. (See Fig. 42.) The thimble 26 is screwed into an end of the finger 24, and is provided with a shoulder 27, which, by engaging a face of the finger, determines the operative position of the thimble. The finger 24 is carried by an operating arm or finger holder 28 preferably by being inserted in a slot 30 in the holder and clamped by a thumb-screw 29. (See Figs. 33, 39, 40, and 41.) Shoulders 31 on the fingers 24, by embracing the holder 28, assist in maintaining the position of the finger in the holder. Whenever it is desired from any cause to replace a pad 25 by another, the finger 24 may be removed from the holder 28 by loosening the screw 29, and the thimble 26, with its pad, may then be replaced by another thimble and pad, or a new pad may be inserted in the thimble. The finger 24 is made removable because its pad is not accessible when the finger is in operative position. After the pad 25 has been renewed the finger 24 is replaced and secured in the holder 28, the shoulders 31 directing the finger as it is replaced to the exact position it occupied before removal.

In Fig. 38 I have indicated by dotted lines 32 the path followed by the operative end of the pad 25 as it operates to buckle a sheet, and by arrows I have shown the direction of movement of the pad, which is caused to follow this path by the operation of parts next to be described.

The finger-holder 28 is pivoted at one end to an arm 35 of a bell-crank lever 33, and at its other end to a link 36, pivoted to an arm 37. (See Figs. 30 to 41.) The lever 33 and arm 37 are each fulcrumed on a stud 38, carried by a projection 39 from a plate 40, carried by the end piece 6 and its extension 17. The lever 33 and arm 37 are operated, respectively, by cams 41 and 42, which are carried by a shaft 43, supported by bearings attached to the plate 40. The cam 41 may operate the lever 33 through the medium of an antifriction-roller 44, carried by the arm 34, which forms a part of the lever 33, and the cam 42 may operate the arm 37 through the medium of an antifriction-roller 45. (See Figs. 30 and 32.) Springs 46 and 47 between the arms 34 and 37, respectively, and a stationary part tend to move the said arms each against the action of its corresponding cam 41 or 42. The cam 41 controls those movements of the finger 24 which move it over the face of the pack and retract it therefrom, and the cam 42 controls those movements which bring the pad 25 against the foremost sheet and remove it therefrom. The combined effect of the two cams is to give to the finger 24 and pad 25 the required motion.

48 is a guard adapted to press against a side edge of the sheets in the pack adjacent to the buckling-finger and serves to bind the edges of the sheets against the action of the buckling-finger to insure the separation of but a single sheet from the pack with each stroke of the finger. This guard may have a fixed position, and the pressure between the guard and the sheets may be produced solely by the forward pressure of the pack over the bottom 5, as has heretofore been the practice when such guards have been used on sheet-holders of the character described, but when the guard is so fixed the pressure against the guard is not precisely uniform, because the pack may not move evenly over the bottom and because thick and heavy packs may press forward with greater force than a pack which has become reduced in thickness by the withdrawal of sheets. I have therefore adapted my guard to operate with a spring-pressure against the sheets, whereby the guard will yield and move forward when the pressure against it exceeds a certain normal amount, so that the forward pressure of the pack will be received more fully by the front of the holder, thereby preventing the pressure against the guard from becoming excessive. To this end I have shown the guard 48 provided with rods or pins 51, extending into and sliding freely in holes 50 in the guide 17, and acted upon by springs 49, surrounding the rods 51 between shoulders 53 on the rods and pins or lugs 52, fixed across the holes 50. The springs 49 normally act to retract the rods 51 and hold the guard 48 against the face of the pack with a yielding pressure. (See Figs. 11, 12, and 13.) I have shown four rods 51 and springs 49, but this number is not material. Stops 54 may be employed to limit the outward movement of the guard 48.

55 is an upwardly-extending lip along the lower edge of the bottom 5, which serves to retain the lower portion of the sheets in the pack from falling outward. The lip 55 is shorter than the edge of the bottom and terminates at a point 56, in Figs. 4, 9, 10, 34, and 37, at some distance from that corner of the holder at which the buckling devices are arranged.

In the drawings c represents a portion of a pack of sheets in the holder, and d the foremost sheet of the pack.

I will now describe the action of the parts named in forming the buckle in a sheet.

The normal position of the buckling-finger and of the parts which operate it is that shown in Figs. 33 and 35. The cams 41 42 act simultaneously to operate the arms 34 37, and as the depressed portions of the cams come opposite the arms the arms are drawn forward by the springs 46 47, and as they move forward motion is transmitted through the connecting-arm 35 and link 36 to the finger-holder 28 and finger 24 to move the finger with its frictional pad 25 forward in the path indicated in Fig. 38. The cam 42 is so shaped that it will permit the pad 25 to drop abruptly upon the pack after the pad has moved forward beyond the guard 48 and thereafter, while the pad is completing its forward movement, will remain out of contact with the roller 45 of the arm 37, by reason of the depth of the depression in the cam, which at this time extends below the roller 45, so that the spring 47 may exert its full force to press the pad 25 against the pack, notwithstanding any small variation in the position of the pack opposite the pad. As the pad 25 makes contact with the pack in the manner stated, its frictional surface acts upon the outermost sheet and draws the corner of the sheet from under the guard 48 and forms a buckle in the sheet in the manner well known in this art. The shape of the buckle (marked $e$) produced by this action is that shown in Figs. 9, 34, and 37. The upper point of the buckle will be at $f$, Fig. 9, and the outermost corner of the buckle will be at the point 56, where the edge lip 55 terminates, as shown in Figs. 9 and 34, where the slight effect produced on the edge of the sheet by the buckling action at the distance of the point 56 from the buckling-finger is overcome by the resistance offered against the movement of the edge of the sheet by the lip 55. If, however, the sheet be stiff, the buckling action may cause a portion of the edge of the sheet to be separated from the pack, so that the outermost corner of the buckle will lie to a greater or less extent beyond the point 56, according to the stiffness of the sheet, and it may lie, for instance, at the point $e'$ in Fig. 27. When the finger 24 has completed its forward movement, it and the parts which operate it will occupy the position shown in Figs. 34 and 36. The cams 41 42 are so shaped that after the buckle has been formed in the sheet they will maintain the buckling-finger 24 at a state of rest for a short period, so as to hold the buckle in the sheet until mechanism which is to further separate the sheet from the pack is brought into action, and will then return the finger to its normal position. The cam 42 is formed with a sharp rise at the point $42^a$, Fig. 35, which acts on the arm 37 at the instant that the finger 24 commences its return movement and causes the pad 25 to move quickly away from the pack to release the buckled sheet and allow it to slip from under the pad 25 without being impeded by the return movement of the pad. The buckling-finger remains at rest in its normal position entirely out of the pathway of a sheet as it is bent outward from the pack until another sheet is to be buckled.

57 is a guide and support for the outer ends of the arm 35 and link 36, which may be used if desired.

After a portion of the foremost sheet has been buckled the entire foremost edge of the sheet is separated from the pack and bent outward by the action of a rotary blade 58, which for purposes of reference may be called a "separator-blade." This blade has a curved cross-section and may be formed by cutting away one side of a piece of tubing 59, so as to leave remaining a portion of the tube of the shape shown in Figs. 8, 24, 25, 26, 43, and 44. The ends of the tube, as at $59^a$ $59^b$, may be left uncut and into these ends may be inserted and secured heads 60 $60^a$, provided with journals 61 $61^a$, supported by bearings 62 $62^a$, carried by yoke-pieces 63 $63^a$, adjustably secured to the end piece 6 $6^a$. When power is applied to the journals 61, the separator-blade will rotate in the direction of the arrow in Fig. 1 about an axis passing through the center of the tube 59. The rotary separator-blade 58 is located immediately below the drum 22 and adjacent to the lower edge of the pack of sheets. The edge of the blade 58 slants spirally with reference to its axis of rotation, and that end of the blade which is most advanced in the direction of its rotation may be conveniently referred to as the "advanced portion," while the other end of the blade may be referred to as the "lower portion" of the blade. The blade 58 is arranged with its advanced portion toward that side of the holder adjacent to which the buckling devices are located, and the advanced portion may be formed into a point 64, adapted to enter under the buckle formed in the edge of the sheet. In Figs. 8, 25, 26, and 44, Section C, the lower portion of the blade is at $64^a$. The length of the separator-blade must be such that it may pass under and bend outward an edge of the widest sheet which is to be handled by the machine.

65 is a small roller provided with journals 66 $66^a$, which are supported in bearings 67 $67^a$, adapted to slide in grooved ways 68 $68^a$, formed in the heads 60 $60^a$, and pressed outward in the ways by springs 69 $69^a$. The ends $59^a$ $59^b$ of the tube 59 pass over the ends of the slideways 68 $68^a$, and thereby limit the outward movement of the bearings 67 $67^a$. When the roller 65 is mounted as described, it occupies a position on one side of the tube 59, opposite the middle portion of the slanting blade 58, and is so placed that its surface projects slightly beyond the face of the blade 58. (See Figs. 43 and 44, Section C.) When the blade 58 rotates, the roller 65 moves in a cylindrical orbit or pathway. As is evident from the construction described, the blade 58 and roller 65 move in unison about the same axis, and the relative position of the blade and roller always remains the same. The roller 65 acts in conjunction with the drum 22 to cause a sheet, after it is bent outward by the separator-blade, to make its first or initial movement from the pack, and, for convenience of designation, I will call it the "orbital initial-sheet-withdrawing roller." In Figs. 8, 24, 25, and 26 the roller 65 is shown in four successive positions which it may occupy in its orbit, to wit, above, in front of, below, and beyond the edge of the blade 58. These four positions are indicated in Fig. 44, Section C, by arrows F, G, H, and I.

Besides the orbital motion of the roller 65, it has an independent rotary movement on its own axis in the direction of the arrow in Fig. 1, imparted to it by a gear 70, fixed on its journal $66^a$, and projecting through an opening formed in the side of the end $59^b$, and meshing with an internally-toothed gear 71, mounted loosely upon the journal $61^a$. To give length of bearing of the gear 71 upon the journal $61^a$, the hub 72 of the gear 71 is extended through the bearing $62^a$, so that the hub 72 turns in the bearing $62^a$ and the journal $61^a$ in the hub 72. As the hub 72 and the journal $61^a$ both turn in the same direction, there is no excessive friction caused by this arrangement, the friction between the journal $61^a$ and hub 72 being only that due to the difference between the speeds of the parts.

73 is an externally-toothed gear carried by the gear 71, through which motion is imparted to the gear 71, and thence through the gear 70 to the roller 65. Because the orbital motion of the roller 65 is about the same axis about which the gear 71 turns, the gears 70 and 71 will remain in mesh whatever may be the position of the roller 65 in its orbit, and the roller 65 may rotate at any required speed without affecting its orbital motion.

74 and $74^a$ are gears, one on each side of the machine, on the journals 61 $61^a$, driven by gears 76 $76^a$ on a shaft 75, supported by bearings 77 $77^a$ in the yoke-pieces 63 $63^a$. (See Figs. 2, 3, 8, and 27.) When the shaft 75 is turned, the journals 61 $61^a$ are driven in unison and power is transmitted from each journal to move the separator-blade and orbital roller in such manner that all twisting strains on these parts are avoided.

By means of set-screws 78, operating between the end pieces 6 $6^a$ and the yoke-pieces 63 $63^a$, the yokes and the parts carried by them may be adjusted to place the separator-blade 58 and roller 65 in proper relation to the face of the pack of sheets and to the drum 22. The yokes 63 $63^a$ may be secured to the end pieces 6 $6^a$ by bolts, as shown, and if the holes through which the bolts pass are made somewhat larger than the bolts sufficient freedom will be permitted for the small amount of movement required in adjusting the yokes. The yokes are preferably so adjusted in relation to the drum 22 that the circular pathway described by the outer projecting surface of the roller 65 will slightly intersect the periphery of the drum 22, but without permitting the separator-blade 58 and tube 59 to make contact with the drum. (See Fig. 30, where a dotted arc through the edge of the drum 22 indicates the intersection here referred to.) As the roller 65 moves through that portion of its orbit opposite the drum 22 it is forced downward to the extent that its pathway intersects the periphery of the drum and to the added extent of the thickness of the sheets which may lie between the roller and drum. The springs 69 69ª press the roller against the drum with a yielding pressure during the period of contact and restores the roller to its normal position after it has passed from under the drum.

79 is the assistant sheet-withdrawing roller, located below the drum 22, immediately in front of the rotary separator-blade, and supported by bearings adapted to slideways formed in the frame sides 2 2ª, and spring-pressed in the usual manner to maintain a yielding contact between the roller and the drum, and this roller is power-driven in the direction of the arrow in Fig. 1.

The surfaces of the drum 22 and of the rollers 65 and 79 are covered with a proper frictional material for making frictional contact with the sheets, and the rotary motions of this drum and of these rollers are regulated so that the surface speed of the drum and the surface speeds of the rollers in contact with the drum will be the same.

As the sheets pass from the withdrawing devices they are received upon a conveyer. The conveyer which I have shown consists of an endless traveling apron formed by a series of cords or bands 80, passing about rollers 81 82, which are supported by bearings carried by the frame sides 2 2ª.

I will now explain the operation of the parts described in individualizing and withdrawing the sheets. A pack of sheets is placed in the holder with the edges of the sheets on one side against the guide 17, and the pressers 20 are placed behind the pack. The yoke-pieces 63 are adjusted to bring the separator-blade 58 and roller 65 into proper relation with the drum 22 and the face of the pack. Supposing the separator-blade to be turned away from the pack, for instance, into the position shown in Fig. 16, the process of withdrawing sheets may be commenced. At this instant the buckling-finger 24 will occupy its retracted position (shown in Fig. 33) and the cams 41 42 will be in the positions shown by full lines in Figs. 33 and 35. While the blade 58 is moving forward to the position shown in Fig. 17 the cams 41 42 turn into the positions shown by full lines in Figs. 34 and 36, thereby permitting the finger 24 to advance and form a buckle in the edge of the foremost sheet in the manner already described. In Fig. 17, e indicates the position of the buckle so formed, and the advanced portion of the separator-blade is shown to have reached a position just adjacent to the buckle. While the blade 58 moves still farther forward to the position shown in Fig. 18 the cams 41 42 turn into the positions shown by dotted lines in Figs. 34 and 36, but do not operate to move the buckling-finger, which during this interval maintains the buckle in the sheet, thereby permitting the advanced portion of the blade 58 to pass into the space under the buckle, as indicated in Fig. 18. While the blade 58 moves forward to the position shown in Fig. 19 the cams 41 42 turn into the positions shown by dotted lines in Figs. 33 and 35, and in so doing operate to retract the buckling-finger 24 in the manner described, and the blade 58 operates on the buckled sheet to bend it slightly forward from the pack to the position shown at g in Fig. 19, with the edge of the sheet projecting into the space between the edge of the blade and the roller 65. In Fig. 20 the blade 58 is shown still farther advanced. This figure has been here introduced to show the manner in which the roller 65 moves onward in its orbit as the edge g of the sheet is pressed forward by the blades 58 and passes around the edge of the sheet without interfering with it. When the separator-blade 58 has reached the position shown in Fig. 21, the portion of the sheet adjacent to the advanced portion of the blade has been fully bent outward about the drum 22, but at this instant the lower portion of the blade is just commencing to pass by the lip 55 on the edge of the bottom of the holder, and if the sheet occupy the whole width of the holder the portion of its edge adjacent to the lower portion of the blade will not have been bent outward from the pack and the edge of the sheet will occupy the position shown in Fig. 10, where one end of the edge of the sheet $d$ is shown still in contact with the pack. In Fig. 21 the dotted curved line reaching from the bent-out corner $g$ of the sheet to the lip 55 represents the lower edge of the sheet when in the position shown in Fig. 10. If, however, the sheet be narrower than the width of the sheet-holder, that corner of the sheet toward the lower portion of the blade will at this instant be bent outward to some extent, as indicated by the dotted line $g'$ in Fig. 10. As the edge of the blade 58 passes gradually from its advanced to its lower portions under the edge of the sheet that edge is pressed outward by the action of the blade over the edge of the lip 55, and during this action the buckling-finger 24 remains in its retracted position. As the separator-blade 58 turns into the position shown in Fig. 22 its lower portion will act upon the sheet and the entire edge of the sheet will be bent about the drum 22, but will not be acted on by the drum, because the blade 58 does not press the sheet against the drum, and the roller 65 will move forward in its orbit and pass behind the outwardly bent edge of the sheet. In Fig. 22, where the parts occupy nearly the position shown in Fig. 17, the roller 65 is shown just making contact with the edge of the sheet which lies between the roller and drum, and while the roller has been moving to this position a buckle $e$ has been formed in the sheet next underlying the sheet $g$ by a second operation of the buckling-finger. As the roller 65 moves forward from the position shown in Fig. 22 it acts upon the sheet by pressing it against the drum 22, and, in conjunction with the drum, partially withdraws the sheet from the pack, for instance, into the position $g$ in Fig. 23, but the extent to which the sheet will be withdrawn by this action depends upon the surface speeds of the drum 22 and roller 65, as they turn together, as related to the speed by which the roller 65 moves forward in its orbit. As the sheet passes into the position in Fig. 23 it passes between the roller 79 and the drum and is received upon the conveyer 80. In Fig. 23, where the parts occupy nearly the position shown in Fig. 18, the roller 65 is shown in that position which it will occupy when just about to pass out of contact with the drum 22, and while the roller has been moving to this position the advanced portion of the blade 58 has entered into the space under the buckle $e$ formed in the sheet next below the sheet $g$. As the roller 65 moves forward out of contact with the drum 22 the withdrawal of the sheet $g$ is continued by the action of the roller 79. If the sheet be short, or if the surface speeds of the drum 22 and roller 79 be fast relatively to the orbital movement of the roller 65, the sheet may be completely withdrawn from the pack before the roller 65 again comes in contact with the drum; but if the sheets be long, or if the surface speeds of the drum 22 and roller 79 be slow relatively to the orbital movement of the roller 65, the roller 65 may again operate upon the sheet by pressing it against the drum 22, and while the sheet is so pressed the sheet will be withdrawn conjointly by the rollers 65 and 79 and the drum 22. If the sheet be very long, or if the surface speed of the drum 22 be very slow, the roller 65 may thus operate several times in succession upon the same sheet. The special purpose of the roller 79 is to make the withdrawal of the sheet continuous by drawing on the sheet when the roller 65 is turned away from the drum 22. When the roller 65, after leaving the position shown in Fig. 23, again returns to the position shown in Fig. 22, the several parts will have assumed successively the positions shown in Figs. 19, 20, and 21, and the separator-blade 58 will have acted upon the sheet next to the sheet $g$ and will have bent its edge wholly from the pack and passed it about the drum 22 in position to be acted upon by the roller 65 and to be withdrawn from the pack.

By the continued operation of the mechanism in the manner described a series of sheets will be successively individualized and withdrawn from the pack.

By the action described one sheet is separated from the pack with each passage of the roller 65 under the drum 22, and the withdrawal of each sheet may be commenced before the sheet previously operated upon has been completely withdrawn. When this is done, the forward edge of each succeeding sheet is bent under the preceding sheet, which yet lies against the withdrawing-drum, and the two sheets are thereafter simultaneously withdrawn from the pack. If the sheets are very long, or if the speed of the drum 22 is very slow, more than two sheets may thus be in process of withdrawal at one time.

The roller 65 may have a constant and uniform orbital movement, but with such a movement the roller will remain in contact with the drum 22 only during a small part of the time which it occupies in making a complete orbital movement, and this period of contact, under some conditions, may not be sufficient to cause a sheet to be withdrawn far enough to place its foremost edge fairly between the roller 79 and the drum 22. In order to increase the time of contact of the roller 65 with the drum 22, and also to cause the operations of buckling the sheet and bending its edge to be made slowly and therefore with a gentler effect, I prefer to give to the roller 65 a variable orbital movement, such that it will move slowly when passing in contact with the drum 22 and faster at other times, and to drive the buckling device by a connection to the devices which give the variable movement to the roller 65 in its orbit. The means which I have shown for producing this variable movement in the roller 65 and for connecting the buckling device to such means will be hereinafter described. From the description already given it will be seen that while the roller 65 is immediately approaching in contact with and receding from the drum 22—for instance, while moving through that half of its orbit from the position shown in Fig. 16 to that shown in Fig. 20—the process of buckling the sheet and partly bending it outward is accomplished, and it is during this portion of its orbit that the roller 65 will have a retarded motion, when it is driven with a variable orbital movement. The roller 65, although retarded while passing through one portion of its orbit, is accelerated to an equal extent in passing through the opposite part of its orbit, so that it may make a certain total number of orbital revolutions in a given time and have its period of contact with the drum 22 lengthened as compared with the period of contact which it would make with the drum if it made the same number of orbital revolutions in the same time with a uniform speed in its orbit.

While I prefer to use the roller 79 to cause the continuous movement of the sheets from the pack, that roller may be omitted and each sheet may be withdrawn by successive contacts of the roller 65 with the drum 22; or a sheet may be completely withdrawn from the pack by each contact of the roller and drum without the aid of the roller 79 when the surface speed of the drum 22 relatively to the period of contact of the roller 65 with the drum is so adjusted that a portion of the surface of the drum equal to the length of the sheets in the pack will pass the roller 65 while the roller and drum remain in contact.

While I have described the cutting of a metallic tube as a convenient way of constructing the separator-blade 58, it is obvious that the blade may be formed of any convenient strip of metal bent to the proper shape and fastened to the heads 60 60ª.

Instead of making the bearings of the roller 65 spring-pressed in the heads 60 60ª, it is obvious that the bearings of the roller-journals may be fixed in the heads which carry them and the bearings 62 62ª be made spring-pressed, or the journals of both the heads 60 60ª and roller 65 may be supported in fixed bearings, and the drum 22 may be allowed slight vertical play, in which case the drum would be slightly lifted by the passing of the roller under it, and the desired effect of yielding pressure between the roller and drum would be attained.

I have described the roller 65 as being positively rotated by power devices. This is desirable in most instances, especially when more sheets than one pass simultaneously between this roller and the drum 22, but under some conditions of feeding, as when the sheets pass singly under the drum, the roller need not be rotated positively, but may be rotated while the roller is in contact with the drum solely by the friction of the passing sheet.

I have described the journals 61 61ª as driven one on each side of the machine, and I have found this method of driving to be necessary in order to move the separator-blade 58 and roller 65 with a steady motion about their cylindrical pathways when the roller 65 is located so closely to the axis of its cylindrical pathway as to prevent a shaft from passing across the machine along the course of that axis, but by locating the roller 65 farther away from the axis of its cylindrical pathway a shaft may be extended entirely across the machine within the orbit of the roller, as at 61 in Fig. 52. In this construction the journals 61 61ª may be formed by the ends of the shaft 61. The heads 60 60ª may be carried by the shaft, and the shaft may be driven at one end only, instead of at both ends. When the shaft 61 passes across the machine, it must be placed in reference to the pack of sheets so that the edge of a sheet as it is bent outward will follow a pathway passing above the shaft, as indicated by the dotted arc in Fig. 52, extending from the lip 55 to the sheet $g$.

Instead of employing the roller 79 to operate against the drum 22 to assist in withdrawing the sheets, the drum 22 may be made of small diameter, and a pair of feeding-rollers 79 81, independent of the drum, as shown in Fig. 52, may be employed to assist in withdrawing the sheets, and the lower roller 81 may, if desired, constitute one of the rollers which support the conveying-cords 80.

When the parts are arranged as shown in Fig. 52, I prefer to provide means attached to the bottom 5 for carrying the drum 22 and the entire front of the holder as well as the roller 65 and separator-blade 58, so that these parts will be adjusted with the adjustment of the bottom, and to have the rollers 79 81 carried by a fixed part of the machine, so as not to be laterally adjustable. Such construction is shown in my Letters Patent No. 544,764.

*The registering mechanism.*—Should any of the sheets be out of proper alinement when they are received upon the conveyer, it is necessary to restore them to their proper position before they are further operated upon. The mechanism which I employ for this purpose consists, in conjunction with the conveyer, of a front stop to temporarily stop the sheets to permit them to be registered, a side gage, and a device for moving the sheets laterally against the side gage.

As the withdrawing mechanism may operate to commence the withdrawal of a second sheet before the previous one has been fully withdrawn and to place the edge of the second sheet under the preceding sheet, it is apparent that when the sheets reach the conveyer they may lie in a series with the foremost sheet on top and with the forward edge of each sheet more or less in advance of the next following sheet. For the proper operation of my registering device the conveyer should be of sufficient length to permit the longest sheet which is to be fed by the machine to lie free upon it, and, as the foremost sheet lies free upon the top of the series of sheets upon the conveyer, it is necessary that the free sheet shall be operated on to move it against the side gage by a device which makes contact with the upper side of the sheet.

The front stop may be of any proper construction and may be operated in any convenient manner. In Fig. 1 I have shown a stop 83, operating in conjunction with feeding-rollers 84 85, and these parts may be constructed and operated as shown in my Letters Patent No. 544,764. (See Fig. 38 of that patent.) The stop 83 reciprocates and at one period of its reciprocation passes across the pathway of the sheets, so that each sheet is temporarily arrested in its forward movement. During this temporary stopping of each sheet the side registering of the sheet is accomplished, after which the front stop moves out of the way and the sheet passes forward and may be removed from the conveyer, as by the action of the feeding-rollers 84 85.

The distance between the forward edges of successive sheets as related to the surface speed of the conveyer must be such that after the top sheet is arrested and before the next underlying sheet can reach the front stop sufficient time will elapse to permit the upper sheet to be registered, to allow the front stop to move away, to permit the forward edge of the registered sheet to pass, and to allow the stop to return to intercept the next sheet.

The side gage which I have shown consists of two gage-fingers or gage-points 86 87, (see Figs. 1 and 7,) against which the sheets are brought to aline them. 88 89 are rotary disks adapted to operate momentarily upon the surface of a sheet to draw the sheet against the gage-points. (See Fig. 47.) I prefer to form the perimeter of the disks 88 89 of rubber, and for this purpose rubber bands 88ª 89ª may surround the disks. The disks 88 89 are mounted upon and rotated by the shaft 90, which has a constant rotation in the direction of the arrow in Figs. 14 and 15.

The shaft 90 is supported by bearings 99ª 100ª on arms 99 100, secured to a rock-shaft 91, parallel to the shaft 90. 101 is an arm secured to the shaft 91, by which the shaft is rocked. The arm 101 is operated by a cam 102 on a shaft 92, parallel to the shafts 90 and 91, preferably through the medium of an antifriction-roller 103, carried by the arm. A spring 104 between the arm 101 and a stationary part holds the arm and its roller 103 in operative contact with the cam 102. The shaft 92 is driven from a transverse shaft 93, supported by bearings carried by the frame-sides 2 2ª, through the medium of bevel-gears 94 95 on the shafts 92 and 93, respectively, and the shaft 90 is rotated from the shaft 92 through the gears 97 and 96 on the shafts 92 and 90, respectively, and the intermediate gear 98, loosely mounted on the rock-shaft 91. (See Figs. 14 and 15.) When the shaft 91 is rocked, it, through the medium of the arms 99 100, imparts a vertical vibratory motion to the shaft 90 and disks 88 89. The cam 102 is shaped to give to the shaft 90 a quick downward motion and to immediately lift and maintain it in a raised position. The shape of this cam is best seen in Fig. 15, where the shaft 90 is shown in a lowered position with the disks 88 pressing upon a sheet. When in this position the depression of the cam 102 is opposite the roller 103, and this depression is sufficiently deep to pass below the roller 103 and permit the spring 104 to exert its entire force to press the disks 88 89 against the sheet. The shaft 90 maintains its rotary motion in whatever position it may be moved by the arms 99 100, because the gear 98, which drives the gear 96 on the shaft 90, turns about the same shaft 91 about which the shaft 90 oscillates.

105 106 are bars carried by the frame sides 2 2ª, extending transversely across the machine below the disks 88 89, and serve to support the sheet on the conveyer against the pressure of the disks. The cords 80 may pass through grooves across the tops of the bars 105 106.

In Fig. 14, m indicates the position which a sheet may occupy before it is registered, and in Fig. 15, n indicates the position of the sheet after it has been brought against the gage-points. To prevent the disks 88 89 from forming a buckle in the sheet or marring its surface if the sheet should reach the position n in Fig. 15 before the contact of the disks with the sheet ceases, I connect the disks with the shaft 90 by a yielding driving connection, which will permit the disks to cease their action when the resistance to movement in the sheet exceeds a certain normal amount. The connection which I have shown for this purpose consists of springs 107 108, which are attached at one end to the shaft 90 and at the other end to the disks. (See Figs. 47 and 48.)

Springs for connecting the disks 88 89 to the shaft 90 may be arranged in many ways. The spring 107 is shown attached at one end to the shaft 90 through the medium of a collar 109 and at its other end to the disk 88 through the medium of a hub or sleeve 110, which carries the disk. The spring 108 is shown attached at one end to the shaft 90 through the medium of a collar 111 and at its other end directly to the disk 89. Keys or stops 113 114, fixed in the collars 109 and 111, respectively, or in the shaft 90, project into recesses 110ª and 112ª, respectively, formed in the hubs 110 and 112 of the disks 88 89. The recesses 110ª 112ª may extend part way around the hubs 110 112, as shown in Fig. 48, Section b. The springs 107 108 normally hold the hubs 110 112 against the keys 113 114 in the position shown in Fig. 48, Section b, but by yielding permit the shaft 90 to turn to the extent permitted by the recesses 110ª 112ª, while the disks 88 89 may be stopped or retarded. The springs 107 108 rotate the disks 88 89 while the sheet is being moved by the disk, but when the resistance in the sheet to movement is increased, as by contact with a gage-point, the springs yield and the rotation of the disks ceases until they are lifted, when the springs restore them to their normal positions.

I will now explain the operation of the parts describe in giving the side register to the sheets.

Supposing the disks 88 89 to be in their raised positions with the high part of the cam 102 acting upon the arm 101, as indicated by full lines in Fig. 14, and with a sheet moving upon the conveyer with its side edge somewhat removed from the side gage, as at m in Fig. 14, the cam as it rotates in the direction indicated by the arrow maintains the disks 88 89 in a raised position until the depressed portion of the cam reaches the position indicated by dotted lines in Fig. 14, where it is just about to pass opposite to the roller 103. At this instant the sheet m is stopped from forward movement by the front stop 83. As the cam 102 continues to turn its depressed portion moves opposite the arm 101 and permits the arm to rise under the action of the spring 104, so that the shaft 91 is rocked and the disks 88 89 are lowered into contact with the sheet m, which they press against the bars 105 106. As the disks turn forward they act by frictional contact upon the sheet and move it laterally against the gage-points 86 87 into the position shown at $n$ in Fig. 15. If the sheet reaches the side gage before the disks are lifted, the yielding connection between the disks and the shaft 90 causes the disks to cease rotating until they are raised from the sheet. By using two disks 88 89, with independent yielding driving connections for each, it is apparent that one disk may yield and cease from rotating while the other continues to turn, so that if a sheet should lie upon the conveyer in a more or less angular position the two disks by operating each independently upon opposite ends of the sheet will bring it into a straight position in contact with the side gage-points. By the time a sheet has been registered by the disks 88 89 the cam 102 will act upon the arm 101 and rock the shaft 91, lifting the disks from the sheet and permitting it to be moved forward when released by the front stop 83.

The operations described are repeated for each sheet registered.

When it is desired to vary the line of registration of the side edges of the sheets, the registering devices are provided with means for lateral adjustment. The shafts 91 and 92 are supported by bearings carried by a longitudinal bar or frame 115, which is supported by and adapted to move upon bars 116, extending transversely over the conveyer and supported by the frame sides 2 2$^a$, and the frame 115 may be provided with shoe-pieces 117 to extend the bearings of the frame upon the bars 116. The gage-fingers 86 87 are also supported by the frame 115. I have shown the finger 87 supported by and forming part of a pendent bracket 118, branching from the frame 115, and the finger 86 supported in a manner to be hereinafter described. The spring 104 is attached at its fixed end to a projection from the frame 115. When the frame 115 is adjusted along the bars 116, the several shafts and other parts carried by the frame are adjusted with it without disturbing their operative relations.

119, 120, and 121 are three transverse guides or rollers supported by bearings carried by the side frames 2 2$^a$ and arranged below the plane of the conveyer. The cords 80 of the conveyer pass about the rollers 119, 120, and 121, so as to form a transverse pocket into which the gage-finger 86 projects and through which it may move when it is adjusted with the frame 115. The gage-finger 87 I have shown located beyond the roller 82, where it may manifestly be moved laterally without being impeded by the cords 80.

The bevel-gear 95 is mounted on the shaft 93, with provision for longitudinal movement, as by a key fixed in the gear and moving in a longitudinal keyway 122 in the shaft. (See Fig. 5.) A bearing 123, carried by the frame 115 and encircling the hub of the gear 95 between shoulders 124 thereon, moves the gear 95 along the shaft 93, when the frame 115 is moved transversely and serves to keep the gears 94 and 95 in proper working mesh, so that the shaft 92 may be driven from the shaft 93 in whatever position the frame 115 may be adjusted.

To adjust the frame 115 along the bars 116 more accurately and easily than the same can be accomplished by hand, I provide the adjusting-screw 125, threaded through a boss or nut 126 on the frame 115 and having its spindle or shank supported by a bearing 127, carried by the frame side 2. The screw 125 may be operated by a hand-wheel 128 on the end of its spindle, and may be maintained in position longitudinally by a collar 129 and by the hub of the hand-wheel making contact with opposite ends of the bearing 127.

The disks 88 89 should operate one adjacent to each end of a sheet. As the forward ends of the sheets always come to a fixed position against the front stop 83, the disk 89, which operates toward that end of the sheets, may operate over the fixed transverse bar 106, and this disk will then act on all sheets at the same distance from their front ends, but the disk 88 must be adjusted to operate in different positions along the length of the conveyer to suit the different lengths of sheets fed by the machine. I have therefore provided means to adjust the disk 88 longitudinally and with it to adjust the position of the bar 105, the gage-point 86, and the rollers 119, 120, and 121.

The bearings which support the guiding-rollers 119, 120, and 121 and the bar 105 are carried by the frames or carriages 130 130$^a$, which rest upon and are adapted to slide along guideways 131 131$^a$ on the frame sides 2 2$^a$, respectively. The bearings of the rollers 119 and 121 are carried directly by the carriages 130 130$^a$, but the roller 120 is mounted loosely upon a shaft 132, which extends through this roller and is journaled in the carriages. Mounted on the shaft 132 are pinions 133 133$^a$, (see Figs. 45 and 46,) adapted to racks 134 134$^a$, secured on the flanges 131 131$^a$. The side edges of these racks 134 134$^a$, which face toward the carriages 130 130$^a$, may serve as guides to direct the carriages when they slide over the flanges 131 131$^a$. When the shaft 132 is turned, the pinions 133 133$^a$ operate in the fixed racks 134 134$^a$ and move the carriages 130 130$^a$ on the flanges 131 131$^a$ to adjust the parts carried by the carriages and the transverse pocket formed in the surface of the conveyer by the rollers 119, 120, and 121 to any desired position along the conveyer.

The shaft 132 may be turned by a hand-wheel or handle 135, secured to it. The handle 135 may have slight longitudinal play on the shaft 132, and a clamping-nut 136 on the end of the shaft may be used to hold the shaft and the parts it operates in any adjusted position when screwed against the hub of the hand-wheel, so as to bind it and the pinion 133 against the bearing of the shaft 132 in the carriage 130.

137 is a bar carried by the carriages 130 130$^a$ and extending transversely across the machine between the rollers 119 121 below the surface of the conveyer, and having a slot or groove 138 formed longitudinally in the top of it.

140 is a tubular shell or casing which surrounds the collar 109, spring 107, and the hub 110 of the disk 88, and has a bearing on the hub 110 sufficient to support it. (See Figs. 47 to 50.) This shell is shown in halves secured by a screw, and may be separated to give access to the inclosed parts. The shell 140 is provided with internal shoulders 141 and 142, (see Fig. 47,) adapted, respectively, to engage a flange 143 on the hub 110 and an end of the collar 109. The shell 140 is carried by a boss or hub 144, which is mounted on the shaft 91, with freedom of longitudinal movement thereon. The shell 140 vibrates vertically with the shaft 90 and disk 88, and the boss 144 rocks with the rock-shaft 91.

139 is a longitudinal groove in the shaft 90, which receives the key 113 and connects the collar 109 with the shaft 90, while permitting it to move longitudinally thereon. (See Figs. 47 and 48.)

145 145 are collars mounted loosely on the shaft 91, one adjacent to each end of the boss 144. The collars 145 145, which do not rock with the shaft 91, are connected together by a tie 146. Depending from one of the collars 145 or from the tie 146 is a pendant or finger 147, provided at its lower end with a tenon 148, adapted to the groove 138 in the bar 137. The pendant 147 is shown extended rearwardly in order to give length to the tenon 148, and its forward face may constitute the gage-point 86. If desired, the collars 145, tie 146, pendant 147, and tenon 148 may be all in one piece or casting, as shown.

When the bar 137 is moved in either direction by the carriages 130 130$^a$, it operates to move the pendant 147 through the engagement of the tenon 148 with the groove 138, and with the pendant to move the collars 145 145, connected thereto, together with the boss 144, which they embrace, along the shaft 91, and to move the shell 140, with which the boss 144 is connected, along the shaft 90. When the shell 140 moves in one direction, its shoulder 141 bears against the flange 143, and moves the hub 110, disk 88, collar 109, and spring 107 to the left, as the parts are viewed in Fig. 47, and when the shell 140 moves in the other direction its shoulder 142 bears against the collar 109 and moves that collar and the spring 107, hub 110, and disk 88 to the right. Thus, however moved or in whatever position adjusted, the parts inclosed by the shell 140 preserve their proper operative relations and the driving connection between these parts and the shaft 90 is maintained. As the bar 137, which moves the disk 88, and the bar 105 are both carried by the carriages 130 130$^a$, the disk 88 will always maintain its proper operative position over the bar 105.

When the registering device is adjusted transversely by the transverse movement of the frame 115, the pendant 147 is correspondingly adjusted through its connection with the shaft 91, which is carried by the frame 115, and the tenon 148 of the pendant slides in the groove 138 along the bar 137.

By the arrangement of the parts as described the transverse and longitudinal adjustments of the registering device may be made independently of one another.

In machines which are to feed short sheets exclusively, I prefer to construct my registering device with but one frictional disk to operate on the sheets to move them sidewise against the gage-points, such disk being arranged to operate about midway between the gage-points.

I have shown the bars 105 106 as supporting the sheets on the conveyer against the action of the disks 88 89, but these bars would not be required when a conveyer was employed having in itself sufficient stiffness to hold the sheets against the disks, or when the disks operate over the rollers of the conveyer as the registering pads operate in my aforesaid Letters Patent No. 544,764.

*The driving mechanism.*—Power and speed may be communicated to the several parts of my feeding-machine in many ways, but I will describe the means which I have shown for such purpose.

149 is the main driving-shaft, supported by the side frames 2 2$^a$, and receiving power in any suitable manner, either from the machine which is being supplied with sheets or from any other suitable source.

150 and 151 are counter or power-distributing shafts extending across the machine and supported by bearings carried by the frame sides 2 2$^a$. The shaft 150, located below the drum 22, is driven from a gear 152 on the main shaft 149, which drives a gear 153 on the shaft 150 through the medium of the compound intermediate gears 154 155 and the intermediate gear 156. The gear 152 drives the gear 154, and the gear 155, which is on the same stud with the gear 154 and connected with it, drives the gear 156. By substituting gears 154 or 155 of different sizes the speed of the shaft 150 may be varied. The shaft 151, located toward the forward end of the machine, is also driven from the gear 152, which drives a gear 157 on the shaft 151 through the medium of the compound intermediate gears 158 159, which are secured together and turn upon a single supporting-stud. By substituting gears 158 or 159, of different sizes, the speed of the shaft 151 may be varied.

The withdrawing-drum 22 is driven from a sprocket 160 on the shaft 151 through the medium of a chain 161, which drives a sprocket 162, mounted loosely on a stud carried by the frame side 2$^a$, and through the further medium of a sprocket 163, secured to the sprocket 162 so as to turn with it and driving a chain 164, passing about a sprocket 165 on the shaft of the withdrawing-drum.

The shaft 75, through which power is transmitted to rotate the separator-blade 58 and to move the roller 65 around its orbital pathway, is driven from a gear 166 on the shaft 150, driving a gear 167 on the shaft 75. (See Fig. 27.) When the orbital movement of the roller 65 is to be uniform, the gears 166 167 may be of ordinary construction, but if the orbital movement of the roller 65 is to be variable the gears 166 167 may be made cam-shaped, as shown, and in this event the gears 76 76$^a$, carried by the shaft 75, and the gears 74 74$^a$, which they drive, must be of uniform diameter and number of teeth, so that the roller 65 will make its orbital movements in unison with the rotation of the shaft 75, and the shafts 150 and 75 must also turn in unison. When the cam-shaped gears 166 167 occupy the position shown in Fig. 27, the roller 65 is passing under the drum 22. When the low part of the gear 166 is driving the high part of the gear 167, as shown in Fig. 27, the shaft 75 will be driven slowly, and the roller 65, at this instant passing under the drum 22, will move slowly as it passes. When the high part of the gear 166 is driving the low part of the gear 167, the shaft 75 will then be driven faster and the roller 65, which at that time is turned away from the drum 22, will move rapidly in its orbit. Thus by means of the cam-shaped gears 166 167 and the driving connections therefrom the roller 65 is moved around its orbit with the variable motion hereinbefore described.

The cam-shaft 43 of the buckling device is driven from the shaft 75 in the following manner: The gear 76 on the shaft 75 drives the gear 74, as previously stated. The gear 74, through the medium of a gear 168, drives a short shaft 169, which carries the gear 168 and has its bearing in a sleeve 170, supported by the yoke-piece 63. (See Fig. 4.) The shaft 169, through the medium of bevel-gears 171 171, drives another short shaft 172, which is supported by a bearing attached to the plate 40, and the shaft 172 drives the shaft 43 through the medium of bevel-gears 173 173. When driven in this manner, the shaft 43 partakes of the variable speed of the shaft 75 when that shaft is driven by the cam-gears 166 167.

The gear 73, through which motion is communicated to rotate the roller 65, is driven from the drum 22 by a gear 174, carried by the shaft of the drum and meshing with the gear 73. (See Figs. 4 and 6.)

The assistant withdrawing-roller 79 is driven from the drum 22 by a gear 175, carried by the shaft of the drum and driving a gear 176 on the journal of the roller 79.

The roller 82 of the sheet-conveyer is driven from a sprocket 177 on the shaft 151 through the medium of a chain 178, which drives a sprocket 179, mounted loosely on a stud carried by the frame side 2$^a$, and through the further medium of a gear 180, secured to the sprocket 179 so as to turn with it, and a gear 181 on the journal of the roller driven by the gear 180. The cords 80 of the conveyer are moved by the roller 82, and these cords, which pass about the rollers 81, 119, 120, and 121, rotate those rollers.

The shaft 93, which drives the registering device, is driven from a gear 182 on the shaft 150 through the medium of an intermediate gear 183, which drives a gear 184, mounted on a stud carried by the frame side 2$^a$, and through the further medium of a sprocket 185, secured to the gear 184 so as to turn with it, and driving a chain 186, passing about a sprocket 187 on the shaft 93. (In Fig. 27 the sprocket 185 is removed to expose the gear 184, which is hidden by the sprocket in Fig. 3.) The gears 182 and 184 are of the same diameter and number of teeth, as are also the sprockets 185 187 and the bevel-gears 94 95, which connect the shaft 93 with the shaft 92. Hence the shafts 150, 93, and 92 turn in unison.

The gears 167 and 73, which are on the same side of the machine, are connected to the bottom of the sheet-holder and move with it when it is adjusted transversely. It is therefore necessary to provide means to adjust the gears 166 and 174, which mesh with the gears 167 and 73, respectively, in such manner that when the gears 167 and 73 move transversely the gears 166 174 will move correspondingly. The shaft 150, which carries the gear 166, is extended on one side of the machine and is supported at its outer end by an end stand 188, and the shaft of the drum 22, which carries the gear 174, is also extended, as at 22$^a$, and its end is also supported by the stand 188. The gears 166 and 174 are mounted on their respective shafts with freedom of longitudinal movement thereon.

189 is a yoke at one end passing over the hub 166$^a$ of the gear 166 between shoulders 190 thereon, and at its other end passing over the hub 174$^a$ of the gear 174 between shoulders 191 thereon, and the yoke may be supported by resting upon these hubs. (See Figs. 7 and 28.) A projection 192, connected with the bottom 5 and moving with it, engages the yoke 189 and moves it when the bottom is adjusted. The projection 192 may form a part of the yoke-piece 63$^a$, and it may engage the yoke 189 by passing through a hole or slot 193 therein. When the bottom 5 is adjusted, the projection 192 moves the yoke 189 correspondingly, and the yoke by its engagement with the shoulders on the hubs of the gears 167 and 174 move the gears 167 and 174 so that their driving engagement with the gears 166 and 73 is not broken when the bottom 5 and the parts carried thereby are adjusted.

By the method of driving described the rotary separator-blade makes a single rotation, the initial-sheet-withdrawing roller a single passage around its orbit, and the reciprocating parts of the buckling and registering devices each make a single movement with each sheet fed. When the speed of the shaft 150 is varied, the speed of the sheet-individualizing, edge-bending, and registering devices and the orbital movement of the initial-sheet-withdrawing roller are varied correspondingly; and by varying the speed of the shaft 150 the rapidity with which sheets are successively separated from the pack and delivered by the machine is regulated. When the speed of the shaft 151 is varied, the speed of rotation of the withdrawing-drum and of the initial and assistant sheet-withdrawing rollers and the speed of the conveyer are varied; and by varying the speed of this shaft 151 the velocity or rate of movement of the sheets as they are withdrawn from the pack and passed through the machine is regulated. Thus by adjusting the speeds of the shafts 150 and 151 any required relation between the rate at which sheets are successively separated from the pack and the velocity of their movement through the machine may be attained.

*Operation of the machine.*—From the foregoing description of the machine its operation in feeding sheets will be readily understood. The bottom of the sheet-holder is adjusted latterly to bring the side guide carried by it to a proper position relatively to the medial line of the machine, the registering device is adjusted to the proper position transversely, the three rollers which produce the transverse pocket across the conveyer and the other parts of the registering device which require longitudinal adjustment are adjusted to suit the length of sheets to be fed, a pack of sheets is placed in the holder, the pressers are placed behind the pack, and proper gears are placed to connect the main driving-shaft with the power-distributing shafts, so as to give to the several parts of the machine the speeds required to cause the sheets to be separated from the pack at the proper rate and to withdraw them from the pack and pass them over the conveyer at the proper velocity. The machine is then started in operation. The sheets are individualized, withdrawn from the pack, and placed upon the conveyer in the manner already described. When the front edge of the free advanced top sheet on the conveyer reaches the front stop, the sheet is arrested and the registering device operates to register it. The front stop then recedes and releases the sheet, which may then be withdrawn from the conveyer and delivered to the machine or mechanism which is to further act upon it.

It is apparent that many details of construction shown are not material to my invention and may be varied in many ways without departing from it, and that portions of my invention may be employed independently of other portions of it, and that in adapting my improved feeding mechanism to different purposes features of the mechanism not required may be omitted.

What I claim as new, and desire to secure by Letters Patent, is—

1. In a machine for feeding sheets from a pack, the combination of a sheet-holder adapted to support a pack of sheets upon their edges in a more or less upright position provided with a laterally-adjustable bottom piece and a front support fixed in respect to the adjustable bottom piece, mechanism carried by and adjustable with said bottom piece adapted to separate an edge of the foremost sheet from the pack and bend it outward therefrom and to assist in withdrawing the sheet after it is bent outward, mechanism independent of said bottom piece carried by the feeding-machine adapted to act in conjunction with the mechanism carried by the bottom piece to withdraw the sheet to a greater or less extent from the pack, power devices carried by the bottom piece for operating the mechanism thereon, power devices carried by the feeding-machine independent of the bottom piece for driving the mechanism on the feeding-machine and connected with the power devices on the bottom piece in such manner that the bottom piece may be adjusted laterally without breaking the power-transmitting connections with the mechanism carried by the bottom piece.

2. In a machine for feeding sheets from a pack, the combination of a sheet-holder adapted to support a pack of sheets upon their edges in a more or less upright position provided with a laterally-adjustable bottom piece and a front support fixed in respect to the adjustable bottom piece, a withdrawing-drum carried by the feeding-machine in a position fixed in respect to and independent of said adjustable bottom piece and located adjacent to the pack of sheets, an individualizing device carried by and adjustable with said bottom piece adapted to raise a portion of the foremost sheet at its edge from other sheets in the pack and a rotary edge-bending and initial-sheet-withdrawing device also carried by and adjustable with said bottom piece embracing a separator-blade and a frictional surface, the separator-blade being adapted to enter first under the raised portion of the sheet and thence to pass under and separate the entire edge of the sheet from the pack and bend it outwardly therefrom, and the frictional surface being adapted to pass behind the edge of the sheet after it is bent outward by the separator-blade and to press that edge against the withdrawing-drum and then to act in conjunction with said drum upon the sheet and withdraw it to a greater or less extent from the pack.

3. In a machine for feeding sheets from a pack, the combination of a sheet-holder adapted to support a pack of sheets upon their edges in a more or less upright position provided with a laterally-adjustable bottom piece and a fixed front independent of the bottom piece, a withdrawing-drum carried by the feeding-machine independent of said bottom piece and located adjacent to the pack of sheets, an individualizing device carried by and adjustable with said bottom piece adapted to raise a portion of the foremost sheet at its edge from other sheets in the pack and a rotary edge-bending and initial-sheet-withdrawing device also carried by and adjustable with said bottom piece embracing a separator-blade and a frictional roller each of which is moved with the rotation of the rotary device in a cylindrical pathway, the separator-blade being adapted to enter first under the raised portion of the sheet and thence to pass under and separate the entire edge of the sheet from the pack and bend it outward therefrom, and the frictional roller being adapted to pass behind the edge of the sheet after it is bent outward by the separator-blade and to press that edge against the withdrawing-drum and then to act in conjunction with said drum upon the sheet and withdraw it to a greater or less extent from the pack, power devices carried by the bottom piece for rotating said rotary device, a power device carried by the bottom piece for rotating said frictional roller while it is being moved around its cylindrical pathway, and power devices carried by the feeding-machine independent of the bottom piece for driving the said withdrawing-drum and connected with the power devices on the bottom piece in such manner that the bottom piece may be adjusted laterally without breaking the power-transmitting connections with the power devices carried by the bottom piece.

4. In a machine for feeding sheets from a pack, the combination of a sheet-holder adapted to support a pack of sheets upon their edges in a more or less upright position provided with a laterally-adjustable bottom piece and a fixed front independent of the bottom piece, a withdrawing-drum carried by the feeding-machine independent of said bottom piece and located adjacent to the pack of sheets, an individualizing device carried by and adjustable with said bottom piece adapted to raise a portion of the foremost sheet at its edge from other sheets in the pack and a rotary edge-bending and initial-sheet-withdrawing device also carried by and adjustable with said bottom piece embracing a separator-blade and a frictional roller which are moved with the rotation of the rotary device in a cylindrical pathway and operate upon the edge of the sheet which is raised by the individualizing device to separate the entire edge of the sheet from the pack and bend it outward therefrom and then in conjunction with said drum to withdraw the sheet to a greater or less extent from the pack, power devices carried by the bottom piece for rotating said rotary device, a power device carried by the bottom piece for rotating said frictional roller while it is being moved around its cylindrical pathway, a power device carried by the feeding-machine independent of the bottom piece connected with the power devices on the bottom piece which rotates the said rotary device, a power device carried by the feeding-machine independent of the bottom piece for rotating said withdrawing-drum and so connected with that power device on the bottom piece which rotates said frictional roller that the frictional roller and the drum will rotate with the same surface speed, the said power devices carried by the feeding-machine being connected with the power devices carried by the bottom piece in such manner that the bottom piece may be adjusted laterally without breaking the power-transmitting connections with the power devices carried by the bottom piece, and means for independently controlling the said power devices carried by the feeding-machine whereby the surface speeds of said drum and roller may be regulated independently of the rate at which the said separator-blade and frictional roller move around the said cylindrical pathway.

5. In a machine for feeding sheets from a pack, a sheet-holder adapted to support a pack of sheets upon their edges in a more or less upright position provided with an inclined front for a face of the pack to bear against, the said front consisting of a series of rollers each provided with a series of disks adapted to extend between the disks of each adjacent roller so as to provide a series of supporting-points staggeringly arranged over the surface of the front, combined with a withdrawing-drum provided with a series of disks adapted to extend between the disks of the lower roller of the front, as and for the purpose described, and means operating in conjunction with said drum for withdrawing the sheets successively from the pack.

6. In a machine for feeding sheets from a pack, the combination of the finger-holder 28, the slot 30 formed in said finger-holder, the buckling-finger 24 adapted to said slot, the shoulder 31 formed on said finger adapted to embrace the said holder, the screw 29, a frictional pad carried by said finger, and means for operating the said holder to cause it to move the finger carried thereby in such manner that the said pad may be moved against the outermost sheet in the pack and form a buckle therein.

7. In a machine for feeding sheets from a pack, the combination of the finger-holder 28, the buckling-finger 24, the frictional pad 25, means for operating the said holder to cause it to move the finger carried thereby in such manner that the said pad may be moved against the outermost sheet in the pack and form a buckle therein, and means for removing said finger from said holder and reattaching it thereto and for renewing the pad in said finger consisting of the slot 30 in said holder adapted to receive said finger, shoulders 31 on said finger adapted to embrace said holder, the screw 29, and the thimble 26 provided with a threaded socket to receive the said pad, a threaded end adapted to be screwed into said finger, and with a shoulder 27 to determine the position of the thimble when screwed into the finger.

8. In a machine for feeding sheets from a pack, the combination of a buckling-finger, a frictional pad carried by said buckling-finger, the lever 33 provided with arms 34 and 35, the link 36, means for pivotally connecting said finger to said arm 35 and to said link 36, the arm 37, stud 38, a support for said stud, the cams 41 and 42, and the springs 46 and 47, all arranged and operated substantially as described to cause the said finger to move its frictional pad against the outermost sheet in the pack and form a buckle therein.

9. In a machine for feeding sheets from a pack, the combination of a buckling-finger, a frictional pad carried by said finger a finger-holder, a clamping device carried by said holder adapted to detachably secure said finger in the holder, the lever 33 provided with arms 34 and 35, the link 36, a pivotal connection between said arm 35 and said finger-holder, a pivotal connection between said link 36 and said finger-holder, the arm 37, a stud 38, a support for said stud, the cams 41 and 42, and the springs 46 and 47, all arranged and operated substantially as described to cause the said finger to move its frictional pad against the outermost sheet in the pack and form a buckle therein.

10. In a machine for feeding sheets from a pack, the combination of a buckling-finger, a frictional pad carried by said buckling-finger, the lever 33 provided with arms 34 and 35, the link 36, means for pivotally connecting said finger to said arm 35 and to said link 36, the arm 37, stud 38, a support for said stud, a support for the outer ends of said arm 35 and link 36, the cams 41 and 42, and the springs 46 and 47, all arranged and operated substantially as described to cause the said finger to move its frictional pad against the outermost sheet in the pack and form a buckle therein.

11. In a machine for feeding sheets from a pack, the combination of an individualizing device adapted to raise a portion of the outermost sheet at its edge from other sheets in the pack, the tube 59 cut away on one side so as to form the spirally-arranged separator-blade 58, the heads 60, 60ª adapted to support said tube at its ends, the journals 61, 61ª carrying said heads, bearings for said journals so arranged in reference to the pack of sheets that the said tube may rotate with its axis of rotation adjacent to and substantially parallel with that edge of the sheet which is raised by the individualizing device, whereby the said blade may enter first under the raised portion of the sheet and thence pass under and separate the entire edge of the sheet from the pack and bend it outward therefrom.

12. In a machine for feeding sheets from a pack the combination with the rotary withdrawing-drum, of a frictional roller adapted to act in conjunction therewith to withdraw a sheet to a greater or less extent from the pack, said roller being adapted to turn upon its bearings when acting in conjunction with the withdrawing-drum, and means to revolve the axis of the frictional roller so that the outer edge of the roller will move in a cylindrical pathway tangential or slightly secant to the periphery of the drum.

13. In a machine for feeding sheets from a pack, the combination of means to separate the foremost edge of the outermost sheet from the pack and bend it outward therefrom, a frictional roller mounted so as to rotate freely in its bearings, bearings for said roller, means for supporting said bearings in such manner and in such positions relatively to the pack of sheets that they may revolve about a common axis of rotation and thereby move the roller carried by said bearings in a cylindrical pathway intersecting the curved pathway followed by the edge of a sheet as it is bent outward, power devices to move said roller around its cylindrical pathway and pass it behind the outwardly-bent edge of the sheet, and a withdrawing-drum mounted in such a position relatively to the pack of sheets and to the cylindrical pathway of said roller that the said roller as it is moved behind the outwardly-bent edge of the sheet may press that edge against the drum and thereby cause the sheet to be withdrawn to a greater or less extent from the pack.

14. In a sheet-feeding machine, the initial-sheet-withdrawing devices, embracing a rotary withdrawing-drum, a rotary separator-blade, and a rotary frictional roller located substantially at the periphery of the rotary separator-blade and arranged to move about the axis of the separator-blade and act in conjunction with the rotary withdrawing-drum upon the edge of a sheet after it is bent outward by the separating-blade.

15. In a machine for feeding sheets from a pack the combination of an individualizing device adapted to raise a portion of the outermost sheet at its edge from other sheets in the pack, a rotary separator-blade having its separating edge extended spirally in the direction of its axis of rotation and arranged with its axis of rotation adjacent to and substantially parallel with that edge of the sheet which is raised by the individualizing device and adapted to enter first under the raised portion of the sheet and thence to pass under and separate the entire edge of the sheet from the pack and bend it outward therefrom, a frictional roller mounted so as to rotate freely in its bearings, bearings for said roller, means for supporting said bearings in such manner and in such position relatively to the pack of sheets that they may revolve about a common axis of rotation and thereby move the roller carried by said bearings in a cylindrical pathway intersecting the curved pathway followed by the edge of a sheet as it is bent outward, power devices to move said roller around its cylindrical pathway and pass it behind the outwardly-bent edge of the sheet, and a withdrawing-drum mounted in such a position relatively to the pack of sheets and to the cylindrical pathway of said roller that the said roller as it is moved behind the outwardly-bent edge of the sheet may press that edge against the drum and thereby cause the sheet to be withdrawn to a greater or less extent from the pack.

16. In a machine for feeding sheets from a pack the combination of an individualizing device adapted to raise a portion of the outermost sheet at its edge from other sheets in the pack, a withdrawing-drum located adjacent to the pack of sheets, and a rotary edge-bending and initial-sheet-withdrawing device embracing a separator-blade and a frictional roller, the separator-blade being adapted to enter first under the raised portion of the sheet and thence to pass under and separate the entire edge of the sheet from the pack and bend it outward therefrom, and the frictional roller being adapted to pass behind the edge of the sheet after it is bent outward by the separator-blade and to press that edge against the withdrawing-drum and then to act in conjuction with said drum upon the sheet and withdraw it to a greater or less extent from the pack.

17. In a machine for feeding sheets from a pack the combination of an individualizing device adapted to raise a portion of the outermost sheet at its edge from other sheets in the pack, a rotary separator-blade having a slanting edge, a frictional roller mounted so as to rotate freely in its bearings, bearings for said roller, means for supporting said separator-blade and said bearings in such manner that the separator-blade and the roller carried by said bearings may revolve in a cylindrical pathway about a common axis of rotation arranged substantially parallel to that edge of the sheet which is raised by the individualizing device, power devices to move said separator-blade and said roller around said cylindrical pathway whereby the said separator-blade will be caused to enter first under the said raised portion of the sheet and thence pass under and separate the entire edge of the sheet from the pack and bend it outward therefrom and whereby the said roller will be caused to pass behind the outwardly-bent edge of the sheet, a withdrawing-drum mounted in such a position relatively to the pack of sheets and to the cylindrical pathway of said roller that the said roller as it moves behind the outwardly-bent edge of the sheet may press that edge against the drum and thereby cause the sheet to be withdrawn to a greater or less extent from the pack, and springs arranged to cause a yielding pressure between said roller and drum when they are pressed together.

18. In a machine for feeding sheets from a pack the combination of an individualizing device adapted to raise a portion of the outermost sheet at its edge from other sheets in the pack, the tube 59 cut away on one side so as to form the separator-blade 58, the heads 60, 60$^a$ fixed into the ends of said tube, grooved ways 68, 68$^a$ formed in said heads, bearings 67, 67$^a$ adapted to move in said ways, the roller 65 having journals 66, 66$^a$ adapted to said bearings, springs 69, 69$^a$ adapted to press the said bearings outward in said ways, stops carried by said heads adapted to limit the outward movement of said bearings, means to support said heads in such manner and in such positions relatively to the pack of sheets that they may rotate about a common axis of rotation and when they rotate may move the said separator-blade and roller in a cylindrical pathway substantially parallel to that edge of the sheet which is raised by the individualizing device and intersecting the curved pathway followed by the edge of a sheet when it is bent outward, power devices to rotate said heads whereby the said separator-blade may be caused to enter first under the said raised portion of the sheet and thence pass under and separate the entire edge of the sheet from the pack and bend it outward therefrom and the said roller be caused to pass behind the outwardly-bent edge of the sheet, and a withdrawing-drum mounted in such a position relatively to the pack of sheets and to the cylindrical pathway of said roller that the said roller as it moves behind the outwardly-bent edge of the sheet may press that edge against the drum with a yielding pressure and thereby cause the sheet to be withdrawn to a greater or less extent from the pack.

19. In a sheet-feeding machine, the combination with the rotary withdrawing-drum, of a rotary frictional roller, means to revolve the axis of the frictional roller so that the outer edge of the roller will move in a cylindrical pathway tangential or slightly secant to the periphery of the drum, and means to independently rotate the frictional roller on its own axis, substantially as and for the purpose described.

20. In a sheet-feeding machine, the combination with the rotary withdrawing-drum, of a rotary frictional roller supported in yielding bearings, means to revolve the axis of the frictional roller so that the outer edge of the roller will move in a cylindrical pathway slightly secant to the periphery of the drum, and means to independently rotate the frictional roller on its own axis, substantially as and for the purpose described.

21. In a machine for feeding sheets from a pack, the combination of means to separate the foremost edge of the outermost sheet from the pack and bend it outward therefrom, a frictional roller mounted so as to rotate freely in its bearings, bearings for said roller, means for supporting said bearings in such manner and in such positions relatively to the pack of sheets that they may revolve about a common axis of rotation and thereby move the roller carried by said bearings in a cylindrical pathway intersecting the curved pathway followed by the edge of a sheet as it is bent outward, power devices to move said roller around its cylindrical pathway and pass it behind the outwardly-bent edge of the sheet, a power device to rotate said roller in its bearings while it is moving around its cylindrical pathway, and a withdrawing-drum mounted in such a position relatively to the pack of sheets and to the cylindrical pathway of said roller that the said roller as it moves behind the outwardly-bent edge of the sheet may press that edge against the drum and by the rotary action of said roller against the drum cause the sheet to be withdrawn to a greater or less extent from the pack.

22. In a machine for feeding sheets from a pack the combination of an individualizing device adapted to raise a portion of the outermost sheet at its edge from other sheets in the pack, a withdrawing-drum located adjacent to the pack of sheets, and a rotary edge-bending and initial-sheet-withdrawing device embracing a separator-blade and a frictional roller each of which is moved with the rotation of the rotary device in a cylindrical pathway the separator-blade being adapted to enter first under the raised portion of the sheet and thence to pass under and separate the entire edge of the sheet from the pack and bend it outward therefrom, and the frictional roller being adapted to pass behind the edge of the sheet after it is bent outward by the separator-blade and to press that edge against the withdrawing-drum and then to act in conjunction with said drum upon the sheet and withdraw it to a greater or less extent from the pack, power devices for rotating said rotary device and a power device for rotating said frictional roller while it is being moved around its cylindrical pathway.

23. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads the roller 65 having journals 66, 66ª adapted to said bearings, the journals 61, 61ª supporting said heads, bearings for the journals 61, 61ª so arranged relatively to the pack of sheets that when the journals 61; 61ª turn therein the said separator-blade and roller may move in a cylindrical pathway substantially parallel to that edge of the sheet which is raised by the individualizing device and intersecting the curved pathway followed by the edge of a sheet when it is bent outward, power devices to rotate said heads whereby the said separator-blade may be caused to enter first under the said raised portion of the sheet and thence pass under and separate the entire edge of the sheet from the pack and bend it outward therefrom and the said roller be caused to pass behind the outwardly-bent edge of the sheet, the gear 70 fixed on said roller, the internal gear 71 meshing with the gear 70 and mounted so as to turn about an axis coincident with the axis about which the said roller moves, a power device to rotate the gear 71 whereby the said roller will be driven through the medium of the gear 70 with a rotary motion while it is passing around its cylindrical pathway, a withdrawing-drum mounted in such a position relative to the pack of sheets and to the cylindrical pathway of said roller that the roller as it moves behind the outwardly-bent edge of the sheet may press that edge against the drum and by the rotary action of said roller against the drum cause the sheet to be withdrawn to a greater or less extent from the pack, and springs arranged to cause a yielding pressure between said roller and drum when they are pressed together.

24. In a machine for feeding sheets from a pack the combination of an individualizing device adapted to raise a portion of the outermost sheet at its edge from other sheets in the pack, a rotary separator-blade having a slanting edge, a frictional roller mounted so as to rotate freely in its bearings, bearings for said roller, means for supporting said separator-blade and said bearings in such manner that the separator-blade and the roller carried by said bearings may revolve in a cylindrical pathway about a common axis of rotation arranged substantially parallel to that edge of the sheet which is raised by the individualizing device, power devices to move said separator-blade and said roller around said cylindrical pathway whereby the said separator-blade will be caused to enter first under the said raised portion of the sheet and thence pass under and separate the entire edge of the sheet from the pack and bend it outward therefrom and whereby the said roller will be caused to pass behind the outwardly-bent edge of the sheet, a power device independent of the power devices which move the said roller around its cylindrical pathway to rotate said roller on its own axis while it is moving around its cylindrical pathway, a withdrawing-drum mounted in such a position relatively to the pack of sheets and to the cylindrical pathway of said roller that the said roller as it moves behind the outwardly-bent edge of the sheet may press that edge against the drum and by the rotary action of said roller against the drum cause the sheet to be withdrawn to a greater or less extent from the pack, a power device for rotating said withdrawing-drum so connected with the power device which rotates said frictional roller that the frictional roller and the drum will rotate with the same surface speed, and means for independently controlling the power devices which move the said roller around its cylindrical pathway and the power devices which rotate said drum and roller whereby the surface speeds of said drum and of said roller may be regulated independently of the rate at which the said roller moves around its cylindrical pathway.

25. In a machine for feeding sheets from a pack the combination of a sheet-individualizing device, the separator-blade 58, the heads 60, 60ª, the journals 61, 61ª, the bearings 62, 62ª, the roller 65 provided with journals 66, 66ª, bearings carried by said heads adapted to the journals 66, 66ª, the gears, 74, 74ª, the shaft 75, the gears 76, 76ª, a power device to rotate said shaft 75, a withdrawing-drum, and a power device to rotate said drum, all arranged and combined substantially as and for the purpose described.

26. In a machine for feeding sheets from a pack the combination of a sheet-individualizing device, the separator-blade 58, the heads 60, 60ª, the journals 61, 61ª, the bearings 62, 62ª, the roller 65 provided with journals 66, 66ª, bearings carried by said heads adapted to the journals 66, 66ª, the gear 70, the internal gear 71, a power device to rotate said gear 71, the gears 74, 74ª, the shaft 75, the gears 76, 76ª, a power device to rotate said shaft 75, a withdrawing-drum, and a power device to rotate said drum, all arranged and combined substantially as and for the purpose described.

27. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads, the roller 65 having journals 66, 66ª adapted to said bearings, the journals 61, 61ª supporting said heads, the bearings 62, 62ª for the last said journals, the adjustable frames 63, 63ª for supporting the last said bearings, a withdrawing-drum mounted adjacent to the pack of sheets and to said roller, springs adapted to press said roller against said drum when the roller and drum are in contact and means to adjust said adjustable frames, all combined and arranged substantially as and for the purpose described.

28. In a machine for feeding sheets from a pack the combination of an individualizing device adapted to raise a portion of the outermost sheet at its edge from other sheets in the pack, a withdrawing-drum located adjacent to the pack of sheets, and a rotary edge-bending and initial-sheet-withdrawing device embracing a separator-blade and a frictional roller which are moved with the rotation of the rotary device in a cylindrical pathway and operate upon the edge of the sheet which is raised by the individualizing device to separate the entire edge of the sheet from the pack and bend it outward therefrom and then in conjunction with said drum to partially withdraw the sheet from the pack, and an auxiliary withdrawing device adapted to act on the partially-withdrawn sheet and assist in withdrawing it from the pack.

29. In a machine for feeding sheets from a pack the combination of an individualizing device adapted to raise a portion of the outermost sheet at its edge from other sheets in the pack, a rotary separator-blade having a slanting edge, a frictional roller mounted so as to rotate freely in its bearings, bearings for said roller, means for supporting said separator-blade and said bearings in such manner that the separator-blade and the roller carried by said bearings may revolve in a cylindrical pathway about a common axis of rotation arranged substantially parallel to that edge of the sheet which is raised by the individualizing device, power devices to move said separator-blade and said roller around said cylindrical pathway whereby the said separator-blade will be caused to enter first under the said raised portion of the sheet and thence pass under and separate the entire edge of the sheet from the pack and bend it outward therefrom and whereby the said roller will be caused to pass behind the outwardly-bent edge of the sheet, a withdrawing-drum mounted in such a position relatively to the pack of sheets and to the cylindrical pathway of said roller that the said roller as it moves behind the outwardly-bent edge of the sheet may press that edge against the drum and thereby cause the sheet to be partially withdrawn from the pack, springs arranged to cause a yielding pressure between said roller and drum when they are pressed together and an auxiliary withdrawing device adapted to act on the partially-withdrawn sheet and assist in withdrawing it from the pack.

30. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads, the roller 65 having journals 66, 66ª adapted to said bearings, the journals 61, 61ª supporting said heads, bearings for the journals 61, 61ª, a withdrawing-drum mounted adjacent to the pack of sheets and to said roller, springs adapted to press said roller against said drum when the roller and drum are in contact, and the assistant withdrawing-roller 79, all combined and operated substantially as and for the purpose described.

31. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads, the roller 65 having journals 66, 66ª adapted to said bearings, the journals 61, 61ª supporting said heads, bearings for the journals 61, 61ª, the gear 70, the internal gear 71, a withdrawing-drum mounted adjacent to the pack of sheets and to said roller, springs adapted to press said roller against said drum when the roller and drum are in contact, and the assistant withdrawing-roller 79, all combined and operated substantially as and for the purpose described.

32. In a machine for feeding sheets from a pack the combination of an individualizing device adapted to raise a portion of the outermost sheet at its edge from other sheets in the pack, a withdrawing-drum located adjacent to the pack of sheets, a rotary edge-bending and initial-sheet-withdrawing device embracing a separator-blade and a frictional roller which are moved by the rotation of the rotary device in a cylindrical pathway and operate upon the edge of the sheet which is raised by the individualizing device to separate the entire edge of the sheet from the pack and bend it outward therefrom and then in conjunction with said drum to withdraw the sheet to a greater or less extent from the pack, and means to drive said rotary device with a variable speed of rotation.

33. In a machine for feeding sheets from a pack the combination of an individualizing device adapted to raise a portion of the outermost sheet at its edge from other sheets in the pack, a rotary separator-blade having a slanting edge, a frictional roller mounted so as to rotate freely in its bearings, bearings for said roller, means for supporting said separator-blade and said bearings in such manner that the separator-blade and the roller carried by said bearings may revolve in a cylindrical pathway about a common axis of rotation arranged substantially parallel to that edge of the sheet which is raised by the individualizing device, a withdrawing-drum mounted adjacent to the pack of sheets and to the said cylindrical pathway, springs arranged to cause a yielding pressure between said roller and drum when they are pressed together, and means to move the said separator-blade and said roller around the said cylindrical pathway with a variable rate of movement such that the roller will move slowly when moving over that part of its pathway adjacent to said drum and faster at other times, for the purposes described.

34. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads, the roller 65 having journals 66, 66ª adapted to said bearings, means to support said heads in such manner and in such positions relatively to the pack of sheets that they may rotate about a common axis of rotation and when they rotate may move the said separator-blade and roller in a cylindrical pathway substantially parallel to that edge of the sheet which is raised by the individualizing device and intersecting the curved pathway followed by the edge of a sheet when it is bent outward, a withdrawing-drum mounted adjacent to the pack of sheets and to the said cylindrical pathway, springs adapted to press said roller against said drum when the roller and drum are in contact, and means to move the said separator-blade and said roller around the said cylindrical pathway with a variable rate of movement such that the roller will move slowly when moving over that part of its pathway adjacent to said drum and faster at other times, for the purposes described.

35. In a machine for feeding sheets from a pack the combination of an individualizing device adapted to raise a portion of the outermost sheet at its edge from other sheets in the pack, the heads 60, 60ª, the separator-blade 58 carried by said heads, the bearings 67, 67ª also carried by said heads, the roller 65 having journals 66, 66ª adapted to said bearings, the journals 61, 61ª supporting said heads, bearings for the journals 61, 61ª so arranged relatively to the pack of sheets that when the journals 61, 61ª turn therein the said separator-blade and roller may move in a cylindrical pathway substantially parallel to that edge of the sheet which is raised by the individualizing device and intersecting the curved pathway followed by the edge of a sheet when it is bent outward, a withdrawing-drum mounted adjacent to the pack of sheets and to the said cylindrical pathway, springs adapted to press said roller against said drum when the roller and drum are in contact, means to move the said separator-blade and said roller around the said cylindrical pathway with a variable rate of movement and a power device to rotate said roller on its own axis while it is moving around its cylindrical pathway.

36. In a machine for feeding sheets the combination of a rotating frictional disk adapted to operate upon a sheet to move it, a device for reciprocating said disk to and from the surface of a sheet, a power device to rotate said disk, and a yielding driving connection between said power device and said disk so arranged that when the resistance to movement in the sheet exceeds a certain normal amount the said connection will yield and permit the disk to cease from rotation until it is raised from the sheet.

37. In a machine for feeding sheets the combination of a frictional disk, a shaft adapted to support and rotate said disk and thereby cause the disk when it is brought into contact with a sheet to seize upon and move it, a device to reciprocate said shaft and the disk carried thereby to bring the disk into momentary contact with the surface of a sheet, and a yielding driving connection between said shaft and said disk so arranged that when the resistance to movement in the sheet exceeds a certain normal amount the said connection will yield and permit the disk to cease from rotation until it is raised from the sheet.

38. In a machine for feeding sheets the combination of a sheet-conveyer, a side gage adapted to engage the side edge of a sheet upon the conveyer, a frictional disk, a device for reciprocating said disk to and from the surface of a sheet upon the conveyer, a power device to rotate said disk and thereby cause the disk when it is in contact with a sheet to move the sheet against the side gage, and a yielding driving connection between said power device and said disk adapted to yield and permit the rotation of the disk to cease if the sheet reaches the side gage before the disk is lifted from the sheet.

39. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a shaft adapted to support and rotate said disk and thereby cause the disk when it is in contact with a sheet upon the conveyer to seize upon and move the sheet against said side gage, a device to reciprocate said shaft and the disk carried thereby to bring the disk into momentary contact with each sheet as it is momentarily arrested upon the conveyer, and a yielding driving connection between said shaft and said disk adapted to yield and permit the disk to cease rotating if the sheet reaches the side gage before the disk is lifted from the sheet.

40. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a rotating shaft carrying said disk while having a limited capacity to turn loosely therein, a key or stop between said disk and said shaft, a device to reciprocate the said shaft and the disk carried thereby to bring the disk into momentary contact with each sheet as it is momentarily arrested upon the conveyer, and a spring carried by said shaft adapted to hold said disk normally against said key or stop and cause the disk when in contact with a sheet to act upon and move it against said side gage and also adapted to yield and permit the disk to cease rotating if the sheet reaches the side gage before the disk is lifted from the sheet.

41. In a machine for feeding sheets the combination of a sheet-conveyer, a stop adapted to arrest a sheet momentarily as it is moved forward by the conveyer, a side gage adapted to engage the side edge of a sheet upon the conveyer, the frictional disks 88, 89, the rotating shaft 90 carrying said disks while having a limited capacity for turning loosely therein, the keys 113, 114, carried by said shaft, the sleeves 110, 112 forming part of said disks, the recesses 110$^a$, 112$^a$ formed in said sleeves and adapted to receive a portion of said keys, a device to reciprocate said shaft and the disks carried thereby to bring the disks into momentary contact with each sheet as it is momentarily arrested upon the conveyer, the springs 107, 108 acting between said shaft and said disks adapted to hold said disks normally with a shoulder of each of said recesses against its corresponding key and cause the disks when in contact with a sheet to act upon and move it against said side gage and adapted to yield and permit either disk to cease rotating if the edge of the sheet adjacent to a disk reaches the side gage before the disks are lifted from the sheet.

42. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a rotating shaft carrying said disk while having a limited capacity to turn loosely therein, a yielding driving connection between said shaft and said disk, a rock-shaft, arms fixed to said rock-shaft, bearings carried by said arms adapted to support said rotating shaft, a device to rock said rock-shaft and thereby through the medium of said arms to reciprocate the said rotating shaft and the disk carried thereby to bring the disk into momentary contact with each sheet as it is momentarily arrested upon the conveyer, and a power device to rotate said rotating shaft, for the purpose described.

43. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a rotating shaft carrying said disk while having a limited capacity to turn loosely therein, a key or stop between said disk and said shaft, a spring driving connection between said shaft and said disk, the rock-shaft 91, the arms 99, 100 fixed to the shaft 91, the bearings 99$^a$, 100$^a$ carried by said arms and adapted to support said rotating shaft, the arm 101 also fixed to said shaft 91, the cam 102 and spring 104 adapted to act conjointly upon the arm 101 and through the medium of the arm 101, shaft 91, arms 99, 100 and bearings 99$^a$, 100$^a$ to reciprocate said rotating shaft and the disk carried thereby to bring the disk into momentary contact with each sheet as it is momentarily arrested upon the conveyer, for the purpose described.

44. In a machine for feeding sheets the combination of the frictional disks 88, 89, the shaft 90, 91 and 92, the gears 96, 97 and 98, the arms 99, 100, the bearings 99$^a$, 100$^a$, the arm 101, the cam 102, the spring 104, the springs 107, 108, the sleeves 110, 112, the keys 113, 114, and the recesses 110$^a$, 112$^a$, arranged and operated substantially as described, and a sheet-conveyer, a stop adapted to arrest a sheet momentarily as it is moved forward by the conveyer, and side gage-points adapted to engage the side edges of a sheet upon the conveyer.

45. In a machine for feeding sheets the combination of an endless traveling apron adapted to receive sheets and to convey them over its surface, a stop adapted to arrest a sheet momentarily as it is carried forward by the said apron, a side gage adapted to engage the side edge of a sheet upon said apron, a frictional disk, a shaft adapted to support and rotate said disk and thereby cause the disk when it is in contact with a sheet upon the apron to seize upon and move the sheet against the said side gage, a device to reciprocate said shaft and the disk carried thereby to bring the disk into momentary contact with each sheet as it is momentarily arrested upon the apron, a fixed surface arranged under the said apron adapted to support the sheet thereon against the pressure of said disk when it rests upon a sheet, and a yielding driving connection between said shaft and said disk adapted to yield and permit the disk to cease rotating if the sheet reaches the side gage before the disk is lifted from the sheet.

46. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a rotating shaft carrying said disk while having a limited capacity to turn loosely therein, a key or stop between said shaft and said disk, a spring driving connection between said shaft and said disk, a device to reciprocate said shaft and the disk carried thereby to bring the disk into momentary contact with each sheet as it is momentarily arrested upon the conveyer, a bar or frame to support said side gage said shaft and the parts carried thereby and said reciprocating device, and means to adjust said bar or frame and the parts carried thereby transversely, for the purposes described.

47. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, a rotating shaft carrying said disk while having a limited capacity to turn loosely therein, a yielding driving connection between said shaft and said disk, a rock-shaft, arms fixed to said rock-shaft, bearings carried by said arms adapted to support said rotating shaft, a device to rock said rock-shaft and thereby through the medium of said arms to reciprocate the said rotating shaft and the disk carried thereby to bring the disk into momentary contact with each sheet as it is momentarily arrested upon the conveyer, a power device to rotate said rotating shaft, cross-bars extending transversely over said apron, a frame adapted to move over said cross-bars and to support said side gage, said rock-shaft and parts carried thereby, said shaft-rocking device and said power device, and means to adjust said frame and the parts carried thereby transversely upon said cross-bars, for the purposes described.

48. In a machine for feeding sheets the combination of a sheet-conveyer, a stop adapted to arrest a sheet momentarily as it is moved forward by the conveyer, a side gage adapted to engage the side edge of a sheet upon the conveyer, the frictional disks 88, 89, the rotating shaft 90 carrying said disks while having a limited capacity to turn loosely therein, a key or stop between each of said disks and said shaft, a spring connecting each of said disks with said shaft, the rock-shaft 91, the arms 99, 100 fixed on said rock-shaft, the bearings 99$^a$, 100$^a$ carried by said arms and supporting said shaft 90, the arm 101 also fixed on said rock-shaft, the rotating shaft 92, the cam 102 carried by the shaft 92 and adapted to operate the arm 101, the spring 104 adapted to press the arm 101 against said cam, the gears 96, 97 and 98 connecting the shaft 92 with the shaft 90, the longitudinal frame 115 adapted to support said side gage, shafts and parts carried thereby and said spring 104, the transverse bars 116 supporting the frame 115, and means to move said frame transversely over said bars, for the purposes described.

49. In a machine for feeding sheets the combination of an endless traveling apron adapted to receive sheets and to convey them over its surface, a stop adapted to arrest a sheet momentarily as it is carried forward by the said apron, a side gage adapted to engage the side edge of a sheet upon said apron, a frictional disk, a shaft adapted to support and rotate said disk, a yielding driving connection between the shaft and disk, a device to reciprocate said shaft and the disk carried thereby to bring the disk into momentary contact with each sheet as it is momentarily arrested upon the apron, a bar or frame to support said side gage, said shaft and the parts carried thereby and the said reciprocating device, means to adjust said bar or frame and the parts carried thereby transversely, and a bar arranged transversely under the said apron adapted to support the sheet thereon against the pressure of said disk when it rests upon the sheet in whatever position the disk may be adjusted, for the purposes described.

50. In a machine for feeding sheets the combination of a sheet-conveyer, a stop adapted to arrest a sheet momentarily as it is moved forward by the conveyer, a side gage adapted to engage the side edge of a sheet upon the conveyer, a frictional disk, the rotary shaft 90 carrying said disk while having a limited capacity to turn loosely therein, a key or stop between said shaft and disk, a yielding driving connection between said shaft and disk, the rotating shaft 92, a driving connection between the shafts 92 and 90, a device operated by said shaft 92 adapted to reciprocate the shaft 90 and the disks carried thereby to bring the disk into momentary contact with each sheet as it is momentarily arrested upon the conveyer, an adjustable bar or frame arranged over the conveyer adapted to support said side gage, shafts, reciprocating device, and the driving connection between said shafts, means to support said bar or frame and to adjust it and the parts carried thereby transversely, power-distributing devices carried by the machine, adjustable driving devices for operating said shaft 92, a power connection between said power-distributing devices and adjustable driving devices, and a connection between said adjustable bar or frame and the adjustable driving devices whereby they will move together and the power connections to the shaft 92 will not be broken by the adjusting of the frame which carries it.

51. In a machine for feeding sheets the combination of an endless traveling apron adapted to receive sheets and to convey them over its surface, guides arranged to deflect the surface of said apron so as to form a transverse pocket therein, a bar extending transversely adjacent to said guides, adjustable supports for said guides and said bar, means to move said supports in such manner that the said guides and the transverse pocket formed thereby and the said bar may be adjusted along the course of said apron, a side gage-finger extending into said pocket, a connection between the said bar and said gage-finger such that when the said guides and said bar are adjusted the said gage-finger will be adjusted therewith, and means independent of the means which adjust said pocket and bar to adjust said gage-finger transversely in the pocket.

52. In a machine for feeding sheets the combination of an endless traveling apron adapted to receive sheets and to convey them over its surface, guides arranged to deflect the surface of said apron so as to form a transverse pocket therein, a bar extending transversely adjacent to said guides adjustable frames for supporting said guides and said bar, means to move said frames in such manner that the said guides and the transverse pocket formed thereby and the said bar may be adjusted along the course of said apron, an adjustable support arranged over said apron, a side gage-finger extending into said pocket and carried by said support in such manner that it may be adjusted in respect thereto, a connection between the said bar and said gage-finger such that when the said guides and said bar are adjusted the said gage-finger will be adjusted along said support to a corresponding extent and means to move said support transversely, whereby the said gage-finger may be adjusted transversely in said pocket in whatever position the pocket may be adjusted.

53. In a machine for feeding sheets, the combination of an endless traveling apron adapted to receive sheets and to convey them over its surface, a group of rollers arranged to depress the plane of said apron so as to form a transverse pocket or depression in its face, adjustable frames for supporting said rollers, guideways for supporting said frames, means to move said frames longitudinally over their guideways to adjust said rollers and the transverse pocket formed thereby along the course of said apron, a side gage-finger extending into said pocket, a bar carried by said adjustable frames and extending through said pocket, a connection between said bar and said gage-finger such that when the frames are moved longitudinally the said gage-finger will be moved therewith, and means to adjust said gage-finger transversely in said pocket in whatever position the pocket may be adjusted.

54. In a machine for feeding sheets, the combination of an endless traveling apron adapted to receive sheets and to convey them over its surface, a group of rollers arranged to depress the plane of said apron so as to form a transverse pocket or depression in its surface, adjustable frames for supporting said rollers, guideways for supporting said frames, means to move said frames longitudinally over their guideways to adjust said rollers and the transverse pocket formed thereby along the course of said apron, a side gage-finger extending into said pocket, a support for said gage-finger, a connection between said adjustable frames and said support such that when the frames are moved longitudinally the said support will move longitudinally to a corresponding extent and thereby the said gage-finger will be adjusted with the adjustment of said pocket, and means to move said support transversely without interfering with its longitudinal movement whereby the said gage-finger may be adjusted transversely in said pocket in whatever position the pocket may be adjusted.

55. In a machine for feeding sheets, the combination of an endless traveling apron adapted to receive sheets and to convey them over its surface, a group of rollers arranged to depress the plane of said apron so as to form a transverse pocket or depression in its face, adjustable frames for supporting said rollers, guideways for supporting said frames, a shaft carried by said frames, pinions carried by said shaft, fixed racks adjusted to said pinions, means to turn said shaft and thereby cause said pinions to operate in said racks and move said frames longitudinally over their guideways to adjust said rollers and the transverse pocket formed thereby along the course of said apron, a side gage-finger extending into said pocket, a support for said gage-finger, a connection between said adjustable frames and said support such that when the frames are moved longitudinally the said support will move longitudinally to a corresponding extent and thereby the said gage-finger will be adjusted with the adjustment of said pocket, and means to move said support transversely without interfering with its longitudinal movement whereby the said gage-finger may be adjusted transversely in said pocket in whatever position the pocket may be adjusted.

56. In a machine for feeding sheets the combination of an endless traveling apron adapted to receive sheets and to convey them over its surface, transverse rollers or guides 119, 120, and 121 about which said apron passes to form a transverse pocket in its surface, the carriages 130, 130ª for supporting said rollers, guides for said carriages, the shaft 132 carried by said carriages, the pinions 133, 133ª carried by said shaft, fixed racks 134, 134ª adapted to said pinions, a hand-operated device by which the shaft 132 may be turned and thereby cause said pinions to operate in said racks and move said carriages longitudinally to adjust said rollers and the transverse pocket formed thereby along the course of said apron, a clamping device adapted to secure said carriages from further movement after they have been adjusted, a side gage-finger extending into said pocket, the bar 137 carried by said carriages, a connection between said bar and said gage-finger such that when the frames are moved longitudinally the said gage-finger will be moved therewith, and means to adjust said gage-finger transversely in said pocket in whatever position the pocket may be adjusted.

57. In a machine for feeding sheets the combination of an endless traveling apron adapted to receive sheets and to convey them over its surface, guides arranged to deflect the surface of said apron so as to form a transverse pocket therein, a bar extending transversely adjacent to said guides adjustable supports for said guides and said bar, means to move said supports in such manner that the said guides and the transverse pocket formed thereby and the said bar may be adjusted along the course of said apron, a side gage-finger extending into said pocket, a connection between the said bar and said gage-finger such that when the said guides and said bar are adjusted the said gage-finger will be adjusted therewith and means independent of the means which adjust said pocket and bar to adjust said gage-finger transversely in the pocket, a gage-finger extending into the space beyond the end of the apron adjacent to the front stop, means to adjust the last-said gage-finger transversely to an extent corresponding to the transverse adjustment of the first-said gage-finger, and a device to engage the surface of a sheet upon the conveyer and move the sheet laterally against the said gage-finger in whatever position the gage-finger may happen to be adjusted.

58. In a machine for feeding sheets, the combination of an endless traveling apron adapted to receive sheets and to convey them over its surface, a group of rollers arranged to depress the plane of said apron so as to form a transverse pocket or depression in its face, adjustable frames for supporting said rollers, guideways for supporting said frames, means to move said frames longitudinally over their guideways to adjust said rollers and the transverse pocket formed thereby along the course of said apron, an adjustable bar or frame arranged over the said apron, a side gage-finger extending into said pocket and supported from said bar in such manner that it may be adjusted in respect thereto, a connection between said adjustable frames and said gage-finger such that when the frames are adjusted the said gage-finger will be adjusted along said bar or frame to a corresponding extent, a gage-finger supported from said bar or frame and extending into the space beyond the end of the apron adjacent to the front stop, means to transversely adjust the said bar or frame and the gage-fingers supported therefrom, and a device to engage the surface of a sheet upon the conveyer and move the sheet laterally against the said gage-fingers in whatever position the gage-fingers may happen to be adjusted.

59. In a machine for feeding sheets, the combination of an endless traveling apron adapted to receive sheets and to convey them over its surface, a stop adapted to arrest a sheet momentarily as it is moved forward by the apron, a series of frictional disks, a rotating shaft carrying said disks while having a limited capacity to turn loosely therein, a key or stop between said shaft and each of said disks, a spring driving connection between said shaft and each of said disks, a device to reciprocate said shaft and the disks carried thereby to bring the disks into momentary contact with each sheet as it is momentarily arrested upon the apron, an adjustable frame arranged over said apron adapted to support said rotating shaft and said reciprocating device, a group of rollers arranged to depress the plane of said apron to form a transverse pocket or depression in its surface, adjustable carriages supporting said rollers, guideways for said carriages, means to move the carriages longitudinally over their guideways, a bar carried by said carriages and extending through said pocket, a side gage-finger extending into said pocket and supported from said frame in such manner that it may be adjusted in respect thereto, a connection from said bar to said gage-finger and to one of said disks such that when the said carriages are adjusted the said gage-finger and the disk connected therewith will be adjusted to a corresponding extent, the said disk as it is adjusted moving longitudinally on said shaft while maintaining its driving connection therewith, a gage-finger supported from said frame extending into the space beyond the end of the apron adjacent to the front stop, and means to adjust said frame and the parts carried thereby transversely, for the purposes described.

60. In a machine for feeding sheets, the combination of an endless traveling apron adapted to receive sheets and to convey them over its surface, a stop adapted to arrest a sheet momentarily as it is moved forward by the apron, a pair of frictional disks, a power device for rotating said disks, a yielding driving connection between said power device and said disks, a device to reciprocate said disks to bring them into momentary contact with each sheet as it is momentarily arrested upon the apron, an adjustable frame arranged over said apron adapted to support said disks, power device, driving connection and reciprocating device a group of rollers arranged to depress the plane of said apron to form a transverse pocket or depression in its surface, a bar extending through said pocket, a bar arranged transversely under said apron adjacent to said group of rollers, supports for said rollers and bars, means to move said supports longitudinally whereby the said rollers and bars may move together along the course of said apron, a side gage-finger extending into said pocket and supported from said frame in such manner that it may be adjusted in respect thereto, a connection from said bar in said pocket to said gage-finger and to one of said disks such that when the said supports are adjusted the said gage-finger and the disks connected therewith will be adjusted to a corresponding extent but without breaking the driving connection between said power device and said disks, a gage-finger supported from said frame extending into the space beyond the end of the apron adjacent to the front stop, and means to adjust said frame and the parts carried thereby transversely, for the purposes described.

61. In a machine for feeding sheets, the combination of an endless traveling apron adapted to receive sheets and to convey them over its surface, a stop adapted to arrest a sheet momentarily as it is moved forward by the apron, the gage-fingers 86, 87, the disks 88, 89, the rotating shaft 90, the groove 139 in said shaft, the rocker-shaft 91, the arms 99, 100, the bearings 99$^a$, 100$^a$, a power device to rotate the shaft 90, a device to rock the shaft 91, the springs 107, 108, the collars 109, 111, the sleeves 110, 112, the keys 113, 114, the recesses 110$^a$, 112$^a$, the adjustable frame 115 arranged over the apron, means to adjust the frame 115 and the parts carried thereby transversely, a group of rollers arranged to depress the plane of said apron so as to form a transverse pocket or depression in its face, adjustable frames for supporting said rollers, means to move said adjustable frames and the rollers carried thereby longitudinally along the course of said apron, a bar carried by said adjustable frames and extending through said pocket, the shell 140, the shoulders 141, 142, the flange 143, the boss 144, the collars 145, 145, the tie 146, the pendant 147, and a connection between the bar in said pocket and said pendant, combined and operated for the purposes described.

62. In a machine for feeding sheets, the combination of an endless traveling apron adapted to receive sheets and to convey them over its surface, rollers supporting and driving said apron some of said rollers being so arranged in respect to that plane of said apron upon which sheets are conveyed as to form a transverse pocket or depression therein and two of the rollers being arranged one on each side of said transverse pocket to determine its width, adjustable frames for supporting the rollers which determine the width of the transverse pocket, guideways for supporting said frames, means to move said frames longitudinally over their guideways to adjust the rollers carried by said frames and the transverse pocket therebetween along the course of said apron, a side gage-finger extending into said pocket, a connection between the said adjustable frames and said side gage-finger such that when the frames are adjusted the said gage-finger may be adjusted therewith, and means to adjust said gage-finger transversely in said pocket.

In testimony of which invention I have hereunto set my hand.

JOHN HENRY KNOWLES.

Witnesses:
ERNEST HOWARD HUNTER,
THOS. L. EVANS.